United States Patent
Sakata et al.

(10) Patent No.: US 11,300,065 B2
(45) Date of Patent: Apr. 12, 2022

(54) METHOD OF CONTROLLING TEMPERATURE OF EXHAUST PURIFICATION DEVICE OF INTERNAL COMBUSTION ENGINE, AND INTERNAL COMBUSTION ENGINE CONTROL DEVICE

(71) Applicant: NISSAN MOTOR CO., LTD., Yokohama (JP)

(72) Inventors: Tomohiro Sakata, Kanagawa (JP); Futoshi Yoshimura, Kanagawa (JP); Yoshihiko Iwabuchi, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 17/050,541

(22) PCT Filed: Apr. 27, 2018

(86) PCT No.: PCT/IB2018/000628
§ 371 (c)(1),
(2) Date: Oct. 26, 2020

(87) PCT Pub. No.: WO2019/207334
PCT Pub. Date: Oct. 31, 2019

(65) Prior Publication Data
US 2021/0239058 A1 Aug. 5, 2021

(51) Int. Cl.
*F01N 3/00* (2006.01)
*F02D 41/02* (2006.01)
(Continued)

(52) U.S. Cl.
CPC .......... *F02D 41/029* (2013.01); *F01N 3/101* (2013.01); *F01N 3/30* (2013.01); *F01N 13/009* (2014.06);
(Continued)

(58) Field of Classification Search
CPC ...... F02D 41/029; F01N 13/009; F01N 3/101; F01N 3/30; F01N 2550/04;
(Continued)

(56) References Cited

U.S. PATENT DOCUMENTS

2008/0314029 A1 12/2008 Okugawa et al.
2009/0320813 A1* 12/2009 Harima ................. F01N 11/002
123/672

(Continued)

FOREIGN PATENT DOCUMENTS

EP  1 801 371 A1  6/2007
JP  05328528 A * 12/1993 ............ B60W 10/08
(Continued)

*Primary Examiner* — Matthew T Largi
(74) *Attorney, Agent, or Firm* — Foley & Lardner LLP

(57) ABSTRACT

A control unit (8) calculates a temperature difference (ΔTg). The temperature difference (ΔTg) is a value obtained by subtracting the temperature (Tg) of a GPF (22) from a target GPF temperature (Tgt). If the temperature difference (ΔTg) is less than or equal to zero, the control unit (8) implements a fuel economy-oriented conventional control. If the temperature difference (ΔTg) is greater than zero, the control unit (8) implements a filter temperature-increasing control. The filter temperature-increasing control causes the exhaust temperature to be increased so that the temperature (Tg) of the GPF (22) becomes greater than or equal to the target GPF temperature (Tgt).

11 Claims, 18 Drawing Sheets

(51) Int. Cl.
*F01N 13/00* (2010.01)
*F01N 3/10* (2006.01)
*F01N 3/30* (2006.01)

(52) U.S. Cl.
CPC ...... *F01N 2550/04* (2013.01); *F01N 2560/06* (2013.01); *F01N 2900/08* (2013.01); *F01N 2900/1404* (2013.01); *F01N 2900/1602* (2013.01)

(58) Field of Classification Search
CPC ............. F01N 2560/06; F01N 2900/08; F01N 2900/1404; F01N 2900/1602
See application file for complete search history.

(56) References Cited

U.S. PATENT DOCUMENTS

| | | | |
|---|---|---|---|
| 2010/0305830 A1* | 12/2010 | Santoso | F01N 3/22 701/103 |
| 2012/0096854 A1* | 4/2012 | Kiran | F01N 3/035 60/602 |
| 2012/0144813 A1* | 6/2012 | Yahata | F01N 11/007 60/311 |
| 2014/0123968 A1* | 5/2014 | Farman | F02B 37/18 123/676 |
| 2017/0305411 A1* | 10/2017 | Leone | F02D 41/0087 |
| 2018/0094556 A1 | 4/2018 | Kurtz et al. | |

FOREIGN PATENT DOCUMENTS

| | | |
|---|---|---|
| JP | 8-35418 A | 2/1996 |
| JP | 2001-271680 A | 10/2001 |
| JP | 2001-271685 A | 10/2001 |
| JP | 2003-184536 A | 7/2003 |
| JP | 2008-115712 A | 5/2008 |
| JP | 2012-107588 A | 6/2012 |
| JP | 2013-47498 A | 3/2013 |
| JP | 2014-134157 A | 7/2014 |
| JP | 2015-4353 A | 1/2015 |
| JP | 2015-151894 A | 8/2015 |
| JP | 2016-164371 A | 9/2016 |
| JP | 2017-210883 A | 11/2017 |
| JP | 2018-3641 A | 1/2018 |

\* cited by examiner

US 11,300,065 B2

METHOD OF CONTROLLING TEMPERATURE OF EXHAUST PURIFICATION DEVICE OF INTERNAL COMBUSTION ENGINE, AND INTERNAL COMBUSTION ENGINE CONTROL DEVICE

TECHNICAL FIELD

The present invention relates to an internal combustion engine exhaust purifier temperature control method and an internal combustion engine control device.

BACKGROUND ART

Conventionally known is a system in which an exhaust purifier is disposed in an exhaust passage connected to an internal combustion engine for purifying exhaust gas exhausted from the internal combustion engine.

A patent document 1 discloses a technique of controlling exhaust gas temperature in accordance with temperature of a three-way catalyst filled in a catalytic converter disposed in an exhaust passage.

According to patent document 1, when the temperature of the three-way catalyst is lower than a target temperature point, the exhaust gas temperature is increased so as to activate the three-way catalyst, and when the temperature of the three-way catalyst becomes higher than or equal to the target temperature point, the three-way catalyst is determined as activated, and the control of increasing the exhaust gas temperature is stopped.

However, according to patent document 1, it is determined based on the temperature of the three-way catalyst of the catalytic converter whether or not to perform the control of increasing the exhaust gas temperature.

Namely, according to patent document 1, the exhaust gas temperature is controlled only with attention to the temperature of the three-way catalyst of the catalytic converter.

In this way, no sufficient study has been made for cases where an exhaust passage is provided with another catalyst having a different function other than the three-way catalyst. Therefore, there is room for further improvement in controlling the exhaust gas temperature.

PRIOR ART DOCUMENT(S)

Patent Document(s)

Patent Document 1: Japanese Patent Application Publication No. H8-35418

SUMMARY OF INVENTION

According to the present invention, an internal combustion engine includes a filter disposed in an exhaust passage and structured to collect exhaust particulate matter in exhaust gas, and in response to a condition that temperature of the filter is lower than or equal to a first preset temperature point, performs a predetermined exhaust gas temperature increase control to increase temperature of the exhaust gas.

The present invention serves to quickly activate the filter by the temperature increase of the exhaust gas, and thereby reduce emission of the exhaust particulate matter.

MODE(S) FOR CARRYING OUT INVENTION

Figure 1:
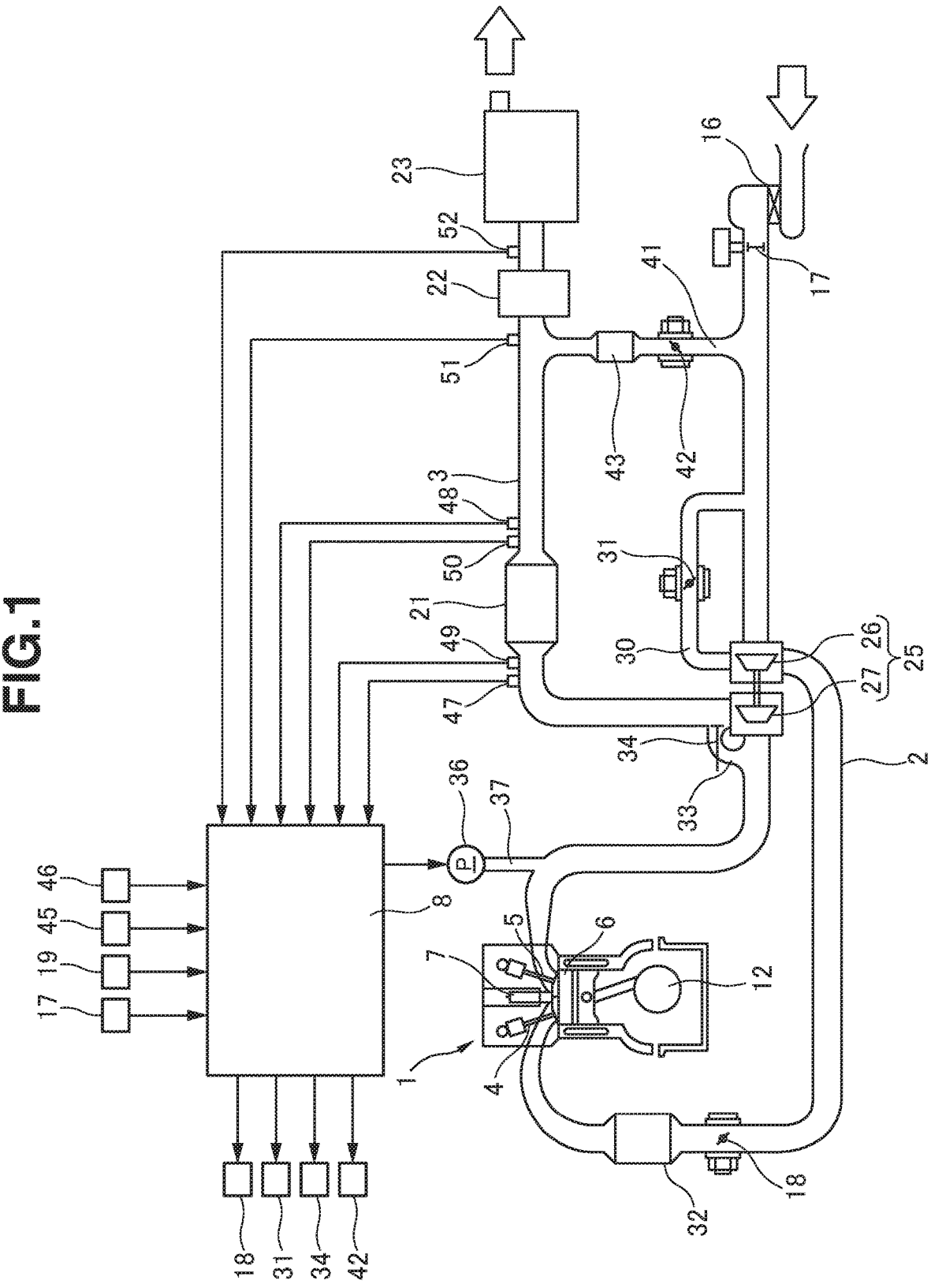
FIG. 1 is an explanatory diagram schematically showing an internal combustion engine control device according to the present invention.

The following describes an embodiment of the present invention in detail with reference to the drawings. FIG. 1 is an explanatory diagram schematically showing a control device of an internal combustion engine 1.

Internal combustion engine 1 is a spark-ignition gasoline engine or the like, and is mounted as a drive source on a vehicle such as an automotive vehicle, and is provided with an intake passage 2 and an exhaust passage 3. Intake passage 2 is connected to a combustion chamber 6 via an intake valve 4. Exhaust passage 3 is connected to combustion chamber 6 via an exhaust valve 5.

Internal combustion engine 1 has an in-cylinder direct injection configuration in this example, wherein each cylinder is provided with an ignition plug 7, and a fuel injection valve not shown for injecting fuel into the cylinder. Injection timing and injection amount of the fuel injection valve and ignition timing of ignition plug 7 are controlled in accordance with control signals from a control unit 8 as a control section.

In intake passage 2, an air cleaner 16, an air flow meter 17, and a throttle valve 18 are provided, wherein air cleaner 16 is structured to collect foreign matter contained in intake air, wherein air flow meter 17 is structured to sense an intake air quantity, and wherein throttle valve 18 is an electronic throttle valve structured to control an intake air quantity entering the cylinder.

Air flow meter 17 includes a temperature sensor inside, and is structured to sense temperature of intake air at an intake inlet. Air flow meter 17 is arranged downstream of air cleaner 16.

Throttle valve 18 includes an actuator such as an electric motor that is structured to control opening of throttle valve 18 in accordance with a control signal from control unit 8. Throttle valve 18 is arranged downstream of air flow meter 17.

The opening of throttle valve 18 (i.e. throttle opening) is sensed by a throttle opening sensor 19. Throttle opening sensor 19 outputs a sensing signal to be inputted to control unit 8.

Exhaust passage 3 is provided with a three-way catalyst 21 as a catalyst, a gasoline particulate filter (GPF) 22 as a filter, and a muffler 23 as a silencer for reducing exhaust noise, which are arranged in series. GPF 22 is arranged downstream of three-way catalyst 21. Muffler 23 is disposed downstream of GPF 22. Three-way catalyst 21 and GPF 22 constitute an exhaust purifier structured to purify exhaust gas exhausted from internal combustion engine 1.

Three-way catalyst 21 is structured to purify three components, i.e. HC, CO and NOx, which are contained in inflowing exhaust gas, when an excess air ratio of the exhaust gas is substantially equal to 1, namely, when an exhaust air-fuel ratio is substantially stoichiometric.

GPF 22 is structured to collect exhaust particulate matter (PM) contained in the exhaust gas.

For example, GPF 22 is implemented by a filter having a wall-flow honeycomb structure (so-called sealed type), which is formed by forming multiple honeycomb-shaped fine passages in a filter material such as cordierite and closing an alternate one of ends of each fine passage. GPF 22 may be structured to carry a catalyst of the same type as three-way catalyst 21.

Internal combustion engine 1 is further provided with a turbocharger 25 as a supercharger which includes a compressor 26 and a turbine 27, wherein compressor 26 and turbine 27 are arranged coaxially, wherein compressor 26 is disposed in intake passage 2, and wherein turbine 27 is disposed in exhaust passage 3. Compressor 26 is arranged upstream of throttle valve 18 and downstream of air flow meter 17. Turbine 27 is arranged upstream of three-way catalyst 21.

Intake passage 2 is connected to an intake bypass passage 30.

Intake bypass passage 30 is formed to bypass the compressor 26 and allow communication between an upstream side and a downstream side of compressor 26.

Intake bypass passage 30 is provided with a recirculation valve 31 of an electronic type. Recirculation valve 31 is closed normally, and is opened when throttle valve 18 is closed and pressure on the downstream side of compressor 26 is increased to be high. By opening the recirculation valve 31, high-pressure intake air downstream of compressor 26 is returned to the upstream side of compressor 26 via intake bypass passage 30. Recirculation valve 31 is controlled to open and close in accordance with a control signal from control unit 8. As an alternative to the type controlled by control unit 8 to open and close, recirculation valve 31 may be implemented by a so-called check valve structured to open only when the pressure on the downstream side of compressor 26 is higher than or equal to a preset pressure point.

In intake passage 2, an intercooler 32 is provided downstream of throttle valve 18, wherein intercooler 32 is structured to cool intake air compressed (or pressurized) by compressor 26, and thereby enhance volumetric efficiency of charging of intake air.

Exhaust passage 3 is connected to an exhaust bypass passage 33 that bypasses the turbine 27 and connects an upstream side of turbine 27 to a downstream side of turbine 27. Exhaust bypass passage 33 has a downstream end connected to a portion of exhaust passage 3 upstream of three-way catalyst 21. A wastegate valve 34 of an electronic type is placed in exhaust bypass passage 33, and structured to control a flow rate of exhaust gas in exhaust bypass passage 33.

Exhaust passage 3 is connected to a secondary air induction passage 37 that is structured to supply secondary air fed from an air pump 36. Secondary air induction passage 37 is connected to a portion of exhaust passage 3 upstream of three-way catalyst 21. In other words, secondary air induction passage 37 is connected to a portion of exhaust passage 3 upstream of turbine 27. The secondary air may be supplied to exhaust passage 3 via exhaust ports of an exhaust manifold.

Internal combustion engine 1 is provided with an EGR passage 41 branched from exhaust passage 3 and connected to intake passage 2, and is structured to perform exhaust gas recirculation (EGR) to bring (recirculate) a part of exhaust gas as an EGR gas from exhaust passage 3 into intake passage 2. EGR passage 41 has a first end connected to a portion of exhaust passage 3 between three-way catalyst 21 and GPF 22, and a second end connected to a portion of intake passage 2 downstream of air flow meter 17 and upstream of compressor 26. In EGR passage 41, an EGR valve 42 and an EGR cooler 43 are provided, wherein EGR valve 42 is of an electronic type and is structured to control the flow rate of EGR gas in EGR passage 41, and wherein EGR cooler 43 is structured to cool the EGR gas. EGR valve 42 is controlled by control unit 8 to open and close.

Control unit 8 is configured to receive input of sensing signals from sensors, i.e. air flow meter 17, throttle opening sensor 19, a crank angle sensor 45 for sensing a crank angle of a crankshaft 12 and also sensing engine speed, an accelerator opening sensor 46 for sensing an amount of depression of an accelerator pedal not shown, an air fuel ratio sensor 47 for sensing an exhaust air fuel ratio upstream (inlet-side) of three-way catalyst 21, an oxygen sensor 48 for sensing an exhaust air fuel ratio downstream (outlet-side) of three-way catalyst 21, a three-way catalyst inlet temperature sensor (third exhaust gas temperature sensor) 49 for sensing an exhaust gas temperature upstream (inlet-side) of three-way catalyst 21, a three-way catalyst outlet temperature sensor (fourth exhaust gas temperature sensor) 50 for sensing an exhaust gas temperature downstream (outlet-side) of three-way catalyst 21, a GPF inlet temperature sensor (first exhaust gas temperature sensor) 51 for sensing an exhaust gas temperature upstream (inlet-side) of GPF 22, and a GPF outlet temperature sensor (second exhaust gas temperature sensor) 52 for sensing an exhaust gas temperature downstream (outlet-side) of GPF 22.

Air fuel ratio sensor 47 is a wide range type air fuel ratio sensor having a linear characteristic of output in proportion to the exhaust air fuel ratio. Oxygen sensor 48 is a sensor structured to sense simply whether the air fuel ratio is rich or lean, wherein its output voltage varies in an on-off manner in a narrow range in vicinity of a theoretical air fuel ratio.

Control unit 8 calculates a required load of internal combustion engine 1 (i.e. engine load), based on a sensing value obtained by accelerator opening sensor 46.

Based on these sensing signals, control unit 8 controls the ignition timing, air-fuel ratio, engine speed, etc. of internal combustion engine 1, and controls air pump 36 that supplies secondary air, and controls the opening of EGR valve 42 for exhaust gas recirculation control (EGR control) for recirculating a part of the exhaust gas from exhaust passage 3 to intake passage 2. Furthermore, control unit 8 controls the opening of throttle valve 18 and the opening of waste gate valve 34, and others.

Control unit 8 calculates a catalyst temperature (bed temperature) of three-way catalyst 21 as a temperature Tt, based on sensing values of three-way catalyst inlet temperature sensor 49 and three-way catalyst outlet temperature sensor 50. Temperature Tt of three-way catalyst 21 is a second internal temperature of the exhaust purifier. Temperature Tt of three-way catalyst 21 may be calculated with corrected based on sensing values of air-fuel ratio sensor 47 and oxygen sensor 48. Furthermore, temperature Tt of three-way catalyst 21 may be a bed temperature of three-way catalyst 21 directly sensed by a temperature sensor.

Control unit 8 calculates a filter temperature of GPF 22 (bed temperature of GPF 22) as a temperature Tg, based on sensing values of GPF inlet temperature sensor 51 and GPF outlet temperature sensor 52. Temperature Tg of GPF 22 is a first internal temperature of the exhaust purifier. Temperature Tg of GPF 22 may be calculated with correction based on sensing values of air-fuel ratio sensor 47 and oxygen sensor 48. Temperature Tg of GPF 22 may be a bed temperature of GPF 22 directly sensed by a temperature sensor.

Efficiency at which GPF 22 collects the exhaust particulate matter in the gasoline engine depends significantly on the Brownian motion. The GPF collection efficiency depending on the Brownian motion is highly dependent on the temperature of GPF 22, the particle diameter of the exhaust particulate matter, and the space velocity of exhaust gas flowing through the GPF 22.

Specifically, the GPF collection efficiency increases as temperature Tg of GPF 22 increases. The GPF collection efficiency increases as the particle diameter of the exhaust particulate matter decreases. The GPF collection efficiency increases, as the space velocity of the exhaust gas flowing through the GPF 22 decreases, namely, as the gas flow velocity decreases.

Figure 2:
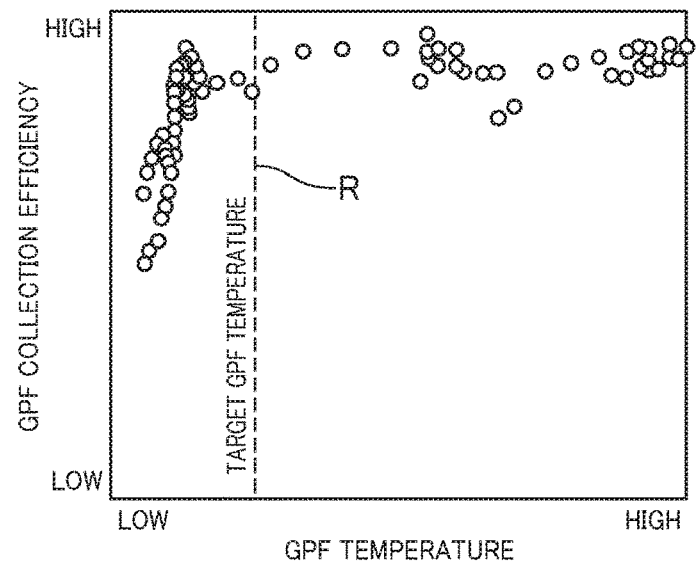
FIG. 2 is an explanatory diagram showing a relationship of GPF between collection efficiency and temperature.

FIG. 2 is an explanatory diagram showing a relationship between temperature Tg of GPF 22 and the GPF collection efficiency.

As shown in FIG. 2, an experiment yielded a result confirming that the GPF collection efficiency is low under a target GPF temperature point Tgt as a first preset temperature point. Target GPF temperature point Tgt, which is indicated by a broken line R in FIG. 2, is a lowermost value of a temperature range within which the collection efficiency of GPF 22 for the exhaust particulate matter converges within a predetermined range, and is a lower limit of the GPF temperature at which the GPF collection efficiency is high stably. In this way, target GPF temperature point Tgt is set, based on the collection efficiency of GPF 22 for exhaust particulate matter. Target GPF temperature point Tgt is set lower than a temperature point at which the exhaust particulate matter collected by GPF 22 are burned and removed.

Even if internal combustion engine 1 is normally controlled when temperature Tg of GPF 22 is low, the GPF temperature gradually rises, but exhaust performance until GPF 22 reaches target GPF temperature point Tgt is maintained low.

In view of the foregoing, when temperature Tg of GPF 22 is low, a filter temperature increase control as an exhaust gas temperature increase control is performed to promote temperature increase of GPF 22 so that temperature Tg of GPF 22 becomes higher than or equal to target GPF temperature point Tgt. The filter temperature increase control is a control of increasing the temperature of the exhaust gas so that temperature Tg of GPF 22 becomes higher than or equal to target GPF temperature point Tgt.

In this embodiment, a normal control is, for example, a control to control the internal combustion engine by setting various manipulated variables with a weight on fuel efficiency. For example, during the normal control, the ignition timing is set to achieve an optimum thermal efficiency, and supercharging is performed so as to conform the intake air amount to a target point. For example, during the normal control, the engine speed is controlled to conform to a target engine speed point that is set depending on an operating state of the engine.

Figure 3:
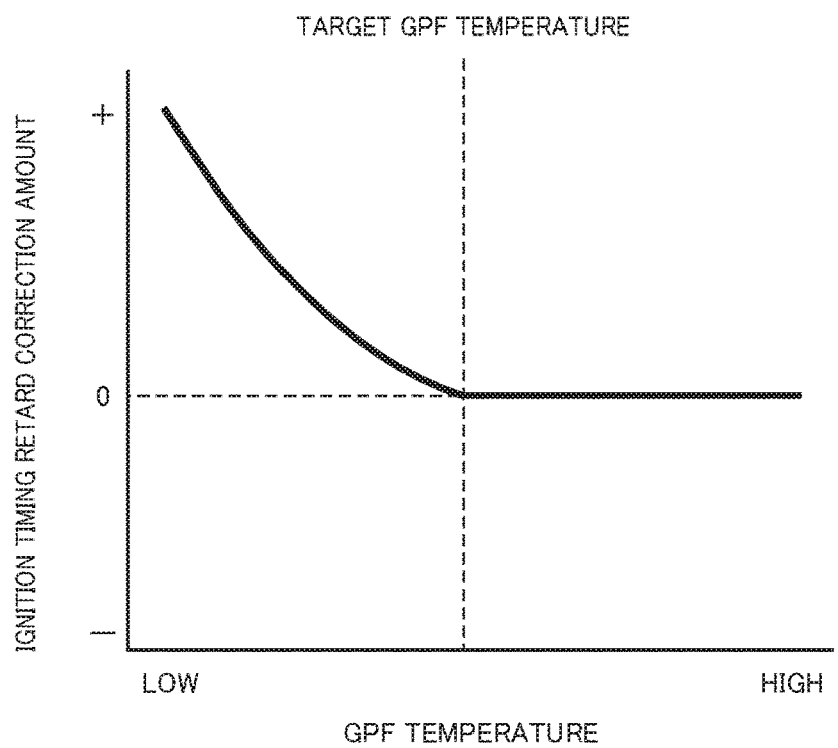
FIG. 3 is an explanatory diagram showing an example of relationship between ignition timing retard correction amount and GPF temperature according to a first embodiment.

The filter temperature increase control of the first embodiment is a control to set the ignition timing of internal combustion engine 1 more retarded than the normal control, when temperature Tg of GPF 22 is low. Specifically, as shown in FIG. 3, a retard correction amount of the ignition timing of internal combustion engine 1 is set such that the ignition timing retard correction amount increases to set the ignition timing more retarded, as temperature Tg of GPF 22 decreases with respect to target GPF temperature point Tgt. Namely, the filter temperature increase control of the first embodiment sets the ignition timing of internal combustion engine 1 more retarded than the normal control, as temperature Tg of GPF 22 decreases with respect to target GPF temperature point Tgt.

Figure 4:
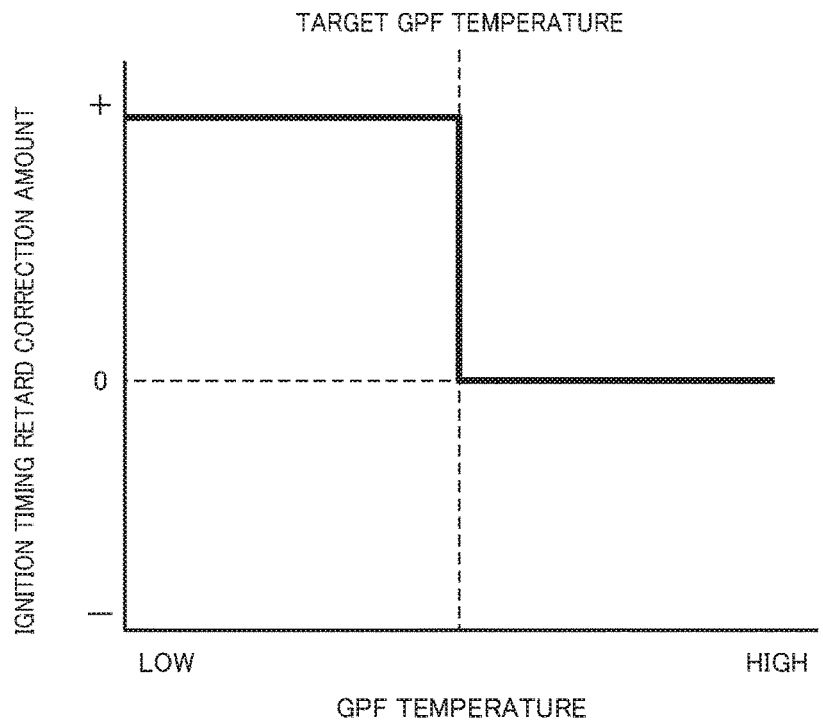
FIG. 4 is an explanatory diagram showing an example of relationship between ignition timing retard correction amount and GPF temperature according to the first embodiment.

The ignition timing retard correction amount for the filter temperature increase control may be set as shown in FIG. 4. In FIG. 4, when temperature Tg of GPF 22 is lower than or equal to target GPF temperature point Tgt, the ignition timing retard correction amount for the filter temperature increase control is set to a preset constant value with respect to temperature Tg of GPF 22. In this way, when temperature Tg of GPF 22 is lower than or equal to target GPF temperature point Tgt, the ignition timing retard amount for the filter temperature increase control may be set to a preset constant value regardless of temperature Tg of GPF 22.

Figure 5:
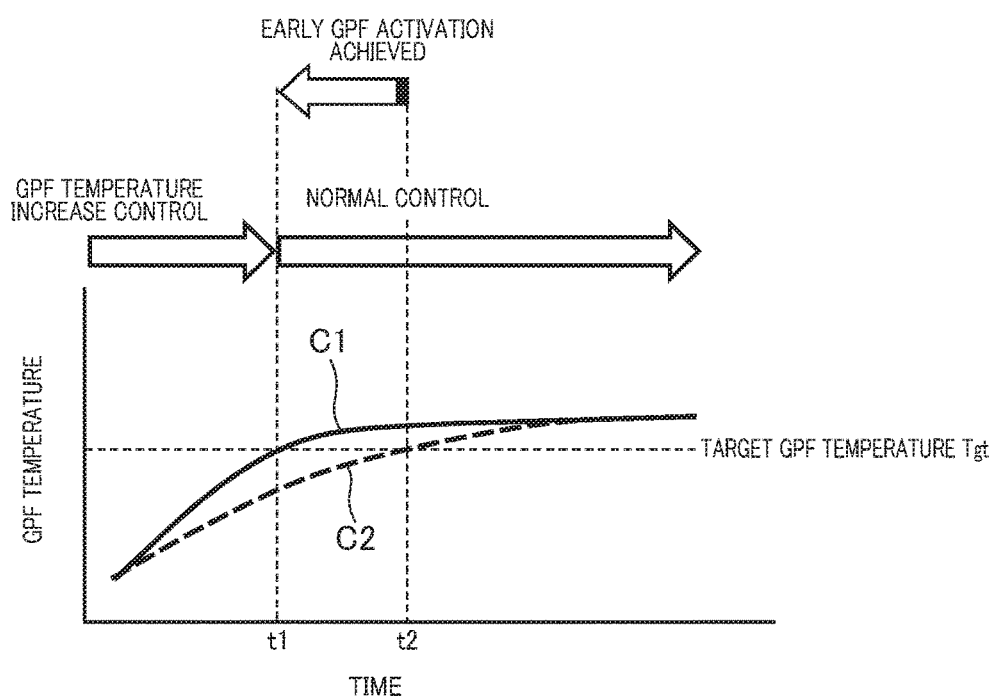
FIG. 5 is an explanatory diagram showing characteristics of increase of the GPF temperature during a filter temperature increase control.

FIG. 5 is an explanatory diagram showing characteristics of increase of the GPF temperature during the filter temperature increase control.

In FIG. 5, a characteristic line C1 in a solid line form indicates characteristics of the temperature of GPF 22 in a case that the filter temperature increase control is performed immediately after internal combustion engine 1 is started. In FIG. 5, a characteristic line C2 in a broken line form indicates characteristics of the temperature of GPF 22 in a case that the filter temperature increase control is not performed after internal combustion engine 1 is started. Namely, characteristic line C2 indicates characteristics of the temperature of GPF 22 when the normal control is solely performed after internal combustion engine 1 is started.

In the case that the filter temperature increase control is performed immediately after the start of internal combustion engine 1, temperature Tg of GPF 22 gets equal to target GPF temperature point Tgt at a time instant t1. Accordingly, after time instant t1, characteristic line C1 indicates behavior after a shift from the filter temperature increase control to the normal control.

As shown in FIG. 5, in the case that the normal control is solely performed after the start of internal combustion engine 1, the temperature of GPF 22 does not reach target GPF temperature point Tgt before a time instant t2 after time instant t1.

In this way, when temperature Tg of GPF 22 is low, by executing the filter temperature increase control after internal combustion engine 1 is started, the temperature of GPF 22 can be quickly increased to target GPF temperature point Tgt or higher. Therefore, the execution of the filter temperature increase control serves to activate GPF 22 as quickly as possible, and reduce a particulate number (PN) indicating an amount of emission of exhaust particulate matter.

Figure 6:
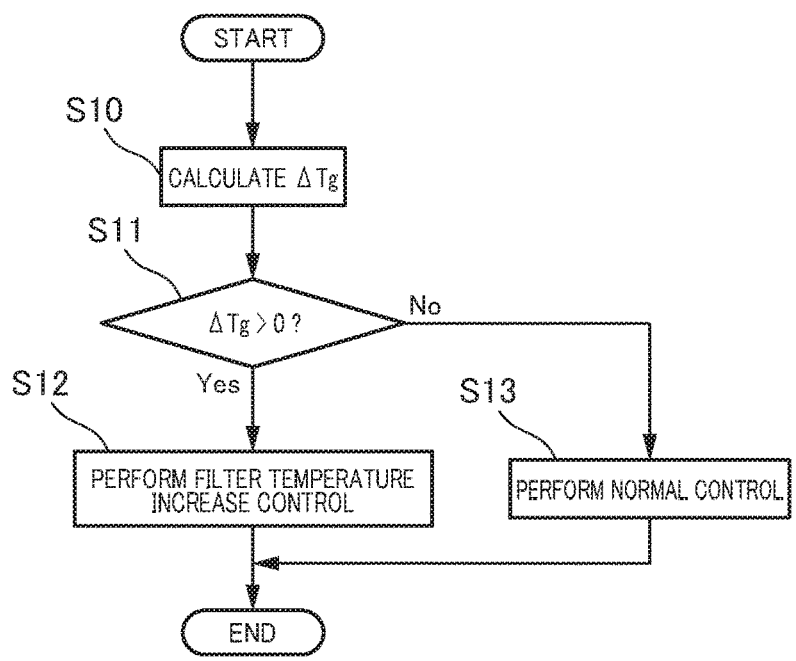
FIG. 6 is a flowchart showing a flow of exhaust purifier temperature control according to the first embodiment.

FIG. 6 is a flowchart showing a flow of exhaust purifier temperature control according to the first embodiment described above.

At Step S10, it calculates a temperature difference ΔTg by subtracting a current value of temperature Tg of GPF 22 from target GPF temperature point Tgt. At Step S11, it determines whether or not temperature difference ΔTg is greater than zero. When temperature difference ΔTg is greater than zero, the process proceeds to Step S12. When temperature difference ΔTg is less than or equal to zero, the process proceeds to Step S13. At Step S12, it performs the filter temperature increase control. At Step S13, it performs the normal control.

The first embodiment relates to a method of controlling the temperature of GPF 22 as an exhaust purifier, and a control device for internal combustion engine 1.

The following describes other embodiments of the present invention, wherein the same components as in the first embodiment are denoted by the same reference numerals, and repetition of description thereof is omitted.

The following describes an exhaust purifier temperature control method and a control device for internal combustion engine 1 according to a second embodiment.

The second embodiment is similar in configuration to the first embodiment. However, the filter temperature increase control of the second embodiment employs, as a manipulated variable, secondary air supplied to the upstream side of GPF 22, instead of the ignition timing, wherein the manipulated variable is to be manipulated to increase the temperature Tg of GPF 22.

Figure 7:
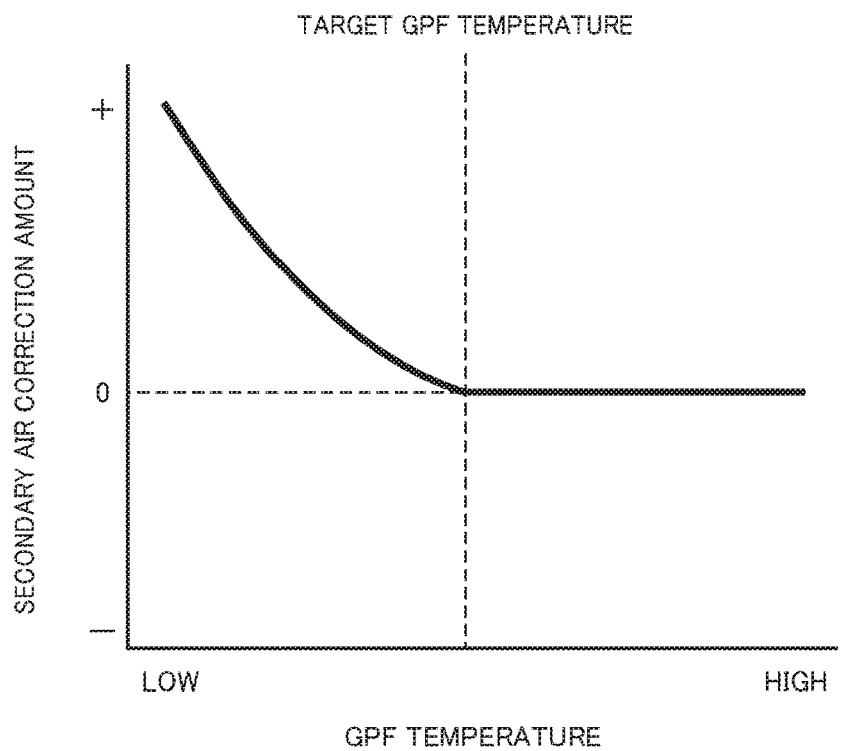
FIG. 7 is an explanatory diagram showing an example of relationship between secondary air correction amount and GPF temperature according to a second embodiment.

The filter temperature increase control of the second embodiment is a control to supply a larger amount of secondary air to the upstream side of GPF 22 than the normal control, when temperature Tg of GPF 22 is low. Specifically, as shown in FIG. 7, a secondary air correction amount is set such that the secondary air correction amount increases to increase the amount of secondary air supplied to exhaust passage 3, as temperature Tg of GPF 22 decreases with respect to target GPF temperature point Tgt. Namely, the filter temperature increase control of the second embodiment increases the amount of secondary air supplied to exhaust passage 3 more than the normal control, as temperature Tg of GPF 22 decreases with respect to target GPF temperature point Tgt.

Figure 8:
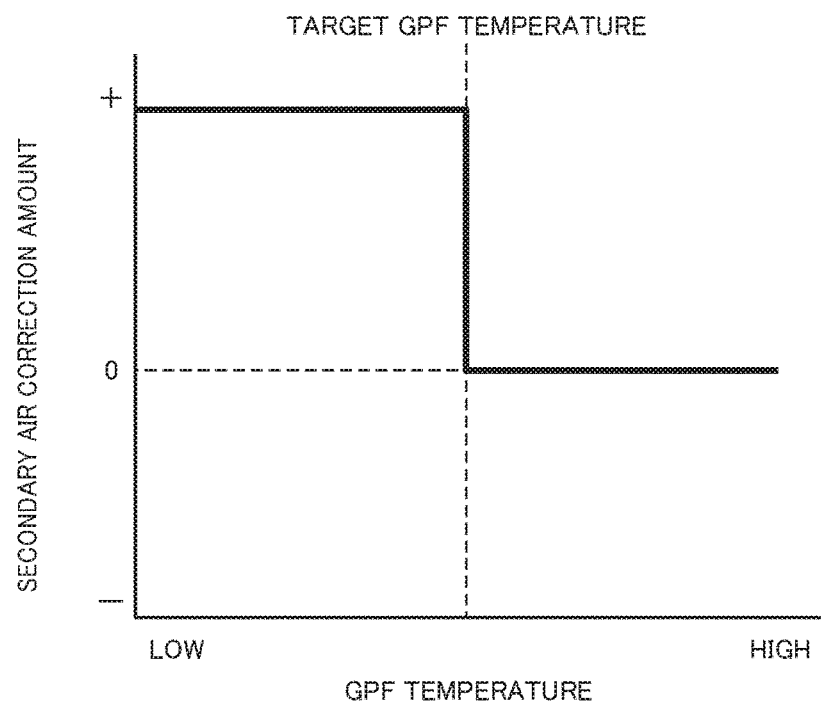
FIG. 8 is an explanatory diagram showing an example of relationship between secondary air correction amount and GPF temperature according to the second embodiment.

The secondary air correction amount for the filter temperature increase control may be set as shown in FIG. 8. In FIG. 8, when temperature Tg of GPF 22 is lower than or equal to target GPF temperature point Tgt, the secondary air correction amount for the filter temperature increase control is set to a preset constant value with respect to temperature Tg of GPF 22. In this way, when temperature Tg of GPF 22 is lower than or equal to target GPF temperature point Tgt, the amount of secondary air supplied to exhaust passage 3 for the filter temperature increase control may be set to a preset constant value regardless of temperature Tg of GPF 22.

The second embodiment described above produces behavior and effects similar to those of the first embodiment.

The following describes an exhaust purifier temperature control method and a control device for internal combustion engine 1 according to a third embodiment.

The third embodiment is similar in configuration to the first embodiment. However, the filter temperature increase control of the third embodiment employs, as a manipulated variable, the degree of opening of wastegate valve 34 (wastegate valve opening), instead of the ignition timing, wherein the manipulated variable is to be manipulated to increase the temperature Tg of GPF 22.

Figure 9:
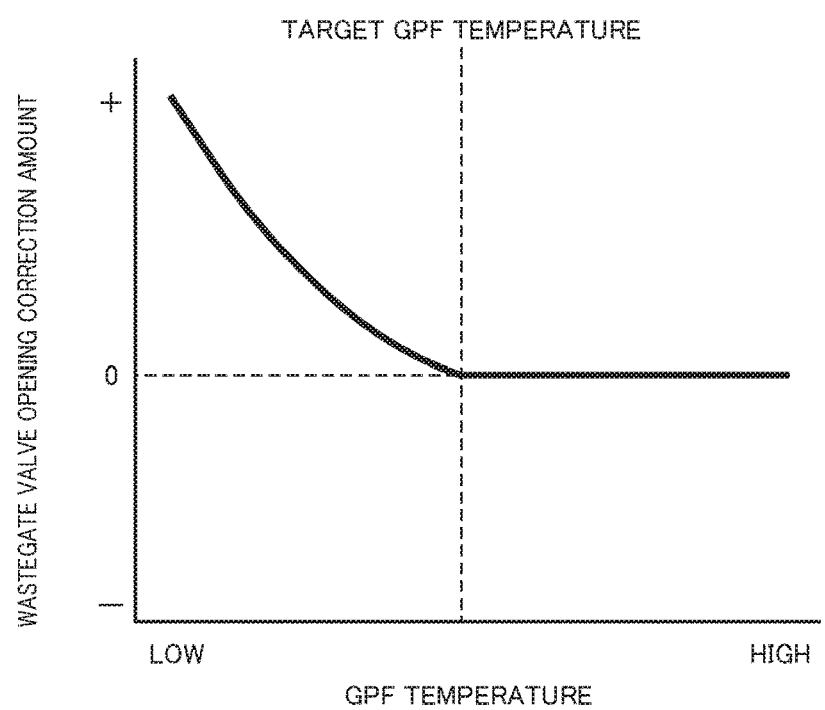
FIG. 9 is an explanatory diagram showing an example of relationship between wastegate valve opening correction amount and GPF temperature according to a third embodiment.

The filter temperature increase control of the third embodiment is a control to set the opening degree of wastegate valve 34 greater than the normal control, when temperature Tg of GPF 22 is low. Specifically, as shown in FIG. 9, a wastegate valve opening correction amount is set such that the wastegate valve opening correction amount increases to increase the opening degree of wastegate valve 34, as temperature Tg of GPF 22 decreases with respect to target GPF temperature point Tgt. Namely, the filter temperature increase control of the third embodiment increases the opening degree of wastegate valve 34 more than the normal control, as temperature Tg of GPF 22 decreases with respect to target GPF temperature point Tgt.

Figure 10:
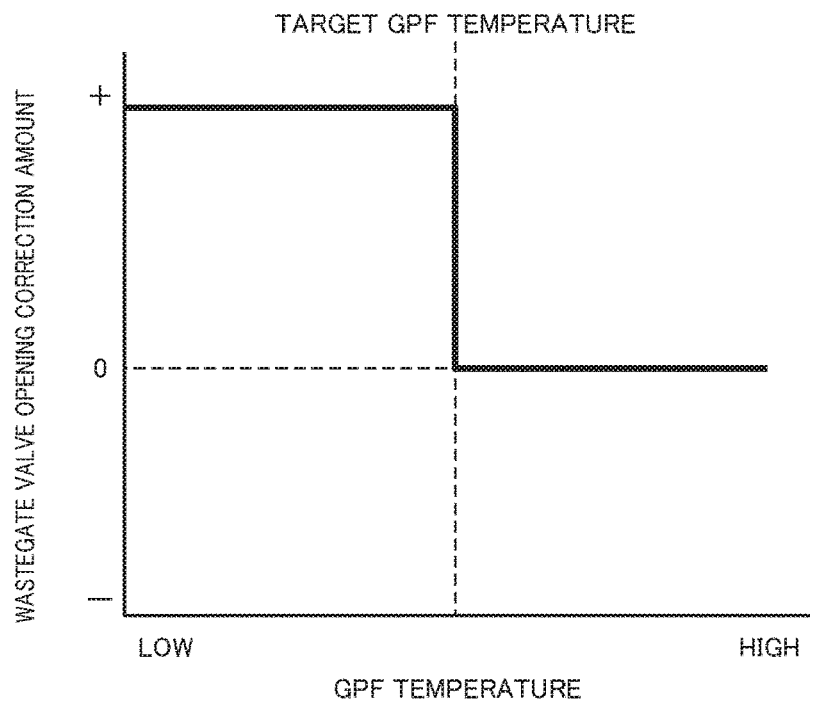
FIG. 10 is an explanatory diagram showing an example of relationship between wastegate valve opening correction amount and GPF temperature according to the third embodiment.

The wastegate valve opening correction amount for the filter temperature increase control may be set as shown in FIG. 10. In FIG. 10, when temperature Tg of GPF 22 is lower than or equal to target GPF temperature point Tgt, the wastegate valve opening correction amount for the filter temperature increase control is set to a preset constant value with respect to temperature Tg of GPF 22. In this way, when temperature Tg of GPF 22 is lower than or equal to target GPF temperature point Tgt, the opening degree of wastegate valve 34 for the filter temperature increase control may be set to a preset constant value regardless of temperature Tg of GPF 22.

The third embodiment described above produces behavior and effects similar to those of the first embodiment.

The following describes an exhaust purifier temperature control method and a control device for internal combustion engine 1 according to a fourth embodiment.

The fourth embodiment is similar in configuration to the first embodiment. However, the filter temperature increase control of the fourth embodiment employs, as a manipulated variable, the engine speed of internal combustion engine 1, instead of the ignition timing, wherein the manipulated variable is to be manipulated to increase the temperature Tg of GPF 22.

Figure 11:
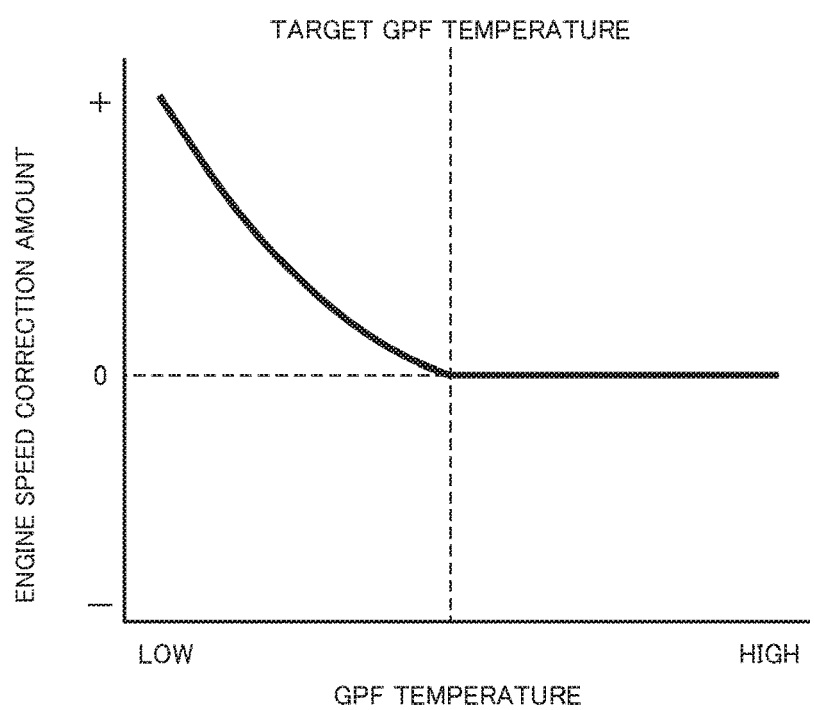
FIG. 11 is an explanatory diagram showing an example of relationship between engine speed correction amount and GPF temperature according to a fourth embodiment.

The filter temperature increase control of the fourth embodiment is a control to set the engine speed of internal combustion engine 1 greater than the normal control, when temperature Tg of GPF 22 is low. Specifically, as shown in FIG. 11, an engine speed correction amount is set such that the engine speed correction amount increases to increase the engine speed of internal combustion engine 1, as temperature Tg of GPF 22 decreases with respect to target GPF temperature point Tgt. Namely, the filter temperature increase control of the fourth embodiment increases the engine speed of internal combustion engine 1 more than the normal control, as temperature Tg of GPF 22 decreases with respect to target GPF temperature point Tgt.

Figure 12:
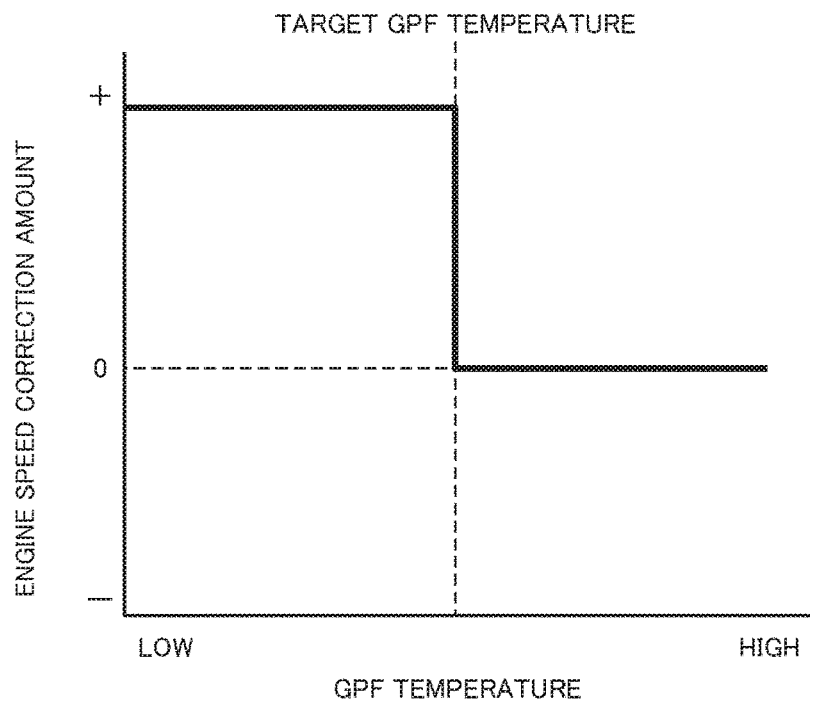
FIG. 12 is an explanatory diagram showing an example of relationship between engine speed correction amount and GPF temperature according to the fourth embodiment.

The engine speed correction amount for the filter temperature increase control may be set as shown in FIG. 12. In FIG. 12, when temperature Tg of GPF 22 is lower than or equal to target GPF temperature point Tgt, the engine speed correction amount for the filter temperature increase control is set to a preset constant value with respect to temperature Tg of GPF 22. In this way, when temperature Tg of GPF 22 is lower than or equal to target GPF temperature point Tgt, the engine speed of internal combustion engine 1 for the filter temperature increase control may be set to a preset constant value regardless of temperature Tg of GPF 22.

The fourth embodiment described above produces behavior and effects similar to those of the first embodiment.

The following describes an exhaust purifier temperature control method and a control device for internal combustion engine 1 according to a fifth embodiment.

The fifth embodiment is similar in configuration to the first embodiment. However, the filter temperature increase control of the fifth embodiment employs a plurality of manipulated variables to be manipulated to increase the temperature Tg of GPF 22. Specifically, in the fifth embodiment, the manipulated variables to be manipulated to increase the temperature Tg of GPF 22 include the ignition timing, the amount of secondary air supplied to the upstream side of GPF 22, the degree of opening of wastegate valve 34 (wastegate valve opening), and the engine speed of internal combustion engine 1.

Figure 13:
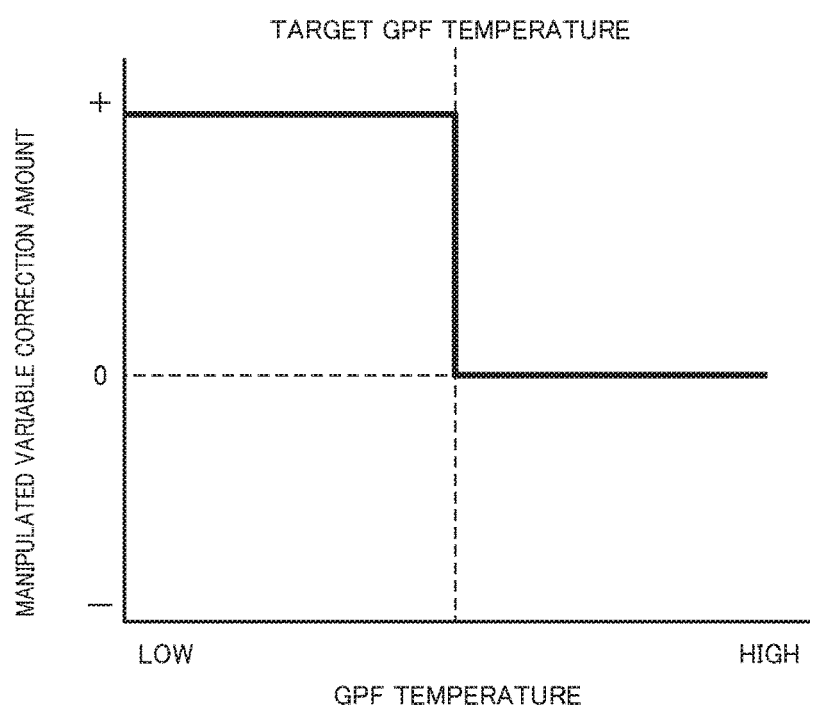
FIG. 13 is an explanatory diagram showing an example of relationship between manipulation amount of manipulated variable and GPF temperature according to a fifth embodiment.

The filter temperature increase control of the fifth embodiment is a control to set the ignition timing of internal combustion engine 1 more retarded, supply a larger amount of secondary air to the upstream side of GPF 22, set the opening degree of wastegate valve 34 greater, and set the engine speed of internal combustion engine 1 greater, than the normal control, when temperature Tg of GPF 22 is low. Specifically, as shown in FIG. 13, when temperature Tg of GPF 22 is lower than or equal to target GPF temperature point Tgt, a correction amount of each manipulated variable (ignition timing, secondary air, wastegate valve opening, and engine speed) is set to a preset constant value with respect to temperature Tg of GPF 22. In this way, when temperature Tg of GPF 22 is lower than or equal to target GPF temperature point Tgt, a manipulation amount of each manipulated variable (ignition timing, secondary air, wastegate valve opening, and engine speed) for the filter temperature increase control is set to a preset constant value regardless of temperature Tg of GPF 22.

In the fifth embodiment, the correction amount of each manipulated variable (ignition timing, secondary air, wastegate valve opening, and engine speed) for the filter temperature increase control may be set such that the correction amount increases as temperature Tg of GPF 22 decreases with respect to target GPF temperature point Tgt. In this way, the filter temperature increase control of the fifth embodiment may set greater the manipulation amount of each manipulated variable (ignition timing, secondary air, waste gate valve opening, and engine speed) than the normal control, as temperature Tg of GPF 22 decreases with respect to target GPF temperature point Tgt.

The fifth embodiment described above produces behavior and effects similar to those of the first embodiment.

In the fifth embodiment, the manipulated variables to be manipulated to increase temperature Tg of GPF 22 may be appropriately selected and combined together from the ignition timing, secondary air, wastegate valve opening, and engine speed.

As described above, the GPF collection efficiency correlates with temperature Tg of GPF 22, the particle diameter of the exhaust particulate matter, and the space velocity of the exhaust gas flowing through the GPF 22.

In terms of temperature Tg of GPF 22, it is most advantageous in improving the GPF collection efficiency to increase the temperature of the exhaust gas by retarding the ignition timing.

In terms of the particle diameter of the exhaust particulate matter, it is most advantageous in improving the GPF collection efficiency to increase the temperature of the exhaust gas by supply of the secondary air, wherein the wastegate valve opening is second most advantageous, and the engine speed is third most advantageous, and is followed by the ignition timing retard.

In terms of the space velocity of the exhaust gas flowing through the GPF 22, it is most advantageous in improving the GPF collection efficiency to increase the exhaust gas temperature by increasing the wastegate valve opening, wherein the engine speed is second most advantageous, and the secondary air is third most advantageous, and is followed by the ignition timing retard.

In view of the foregoing, the manipulated variables employed for the filter temperature increase control may be determined in consideration of the GPF collection efficiency during the filter temperature increase control.

Furthermore, for the filter temperature increase control of the fifth embodiment in which the manipulated variables are manipulated, it is desirable to select one of the manipulated variables with priority, which is advantageous in improving the GPF collection efficiency.

The following describes an exhaust purifier temperature control method and a control device for internal combustion engine 1 according to a sixth embodiment.

The sixth embodiment is similar in configuration to the first embodiment, and is configured to perform an exhaust gas temperature increase control to promote temperature increase of three-way catalyst 21 and GPF 22 so as to set the temperature Tg of GPF 22 higher than or equal to target GPF temperature point Tgt, and set the temperature Tt of three-way catalyst 21 higher than or equal to a target three-way catalyst temperature point Ttt as a second preset temperature point. Target three-way catalyst temperature Ttt is a preset temperature at which three-way catalyst 21 is activated.

The exhaust gas temperature increase control of the sixth embodiment is a control to increase the temperature of the exhaust gas so as to set the temperature Tt of three-way catalyst 21 higher than or equal to target three-way catalyst temperature Ttt and set the temperature Tg of GPF 22 higher than or equal to target GPF temperature point Tgt.

Figure 14:
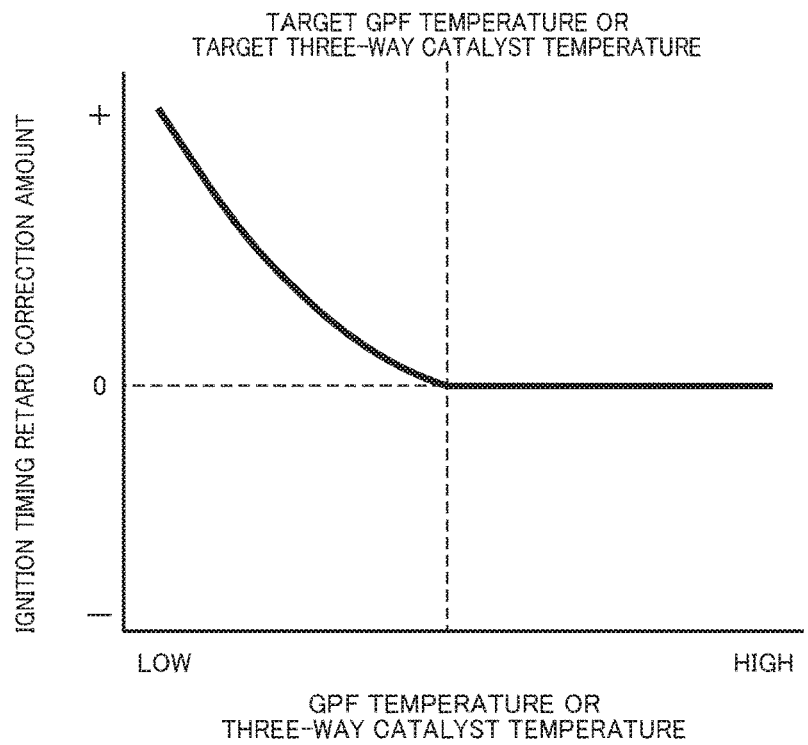
FIG. 14 is an explanatory diagram showing an example of relationship between ignition timing retard correction amount and GPF temperature or three-way catalyst temperature according to a sixth embodiment.

The exhaust gas temperature increase control of the sixth embodiment is a control to set the ignition timing of internal combustion engine 1 more retarded than the normal control, when temperature Tt of three-way catalyst 21 or temperature Tg of GPF 22 is low. Specifically, as shown in FIG. 14, a retard correction amount of the ignition timing of internal combustion engine 1 is set such that the ignition timing retard correction amount increases to set the ignition timing more retarded, as temperature Tt of three-way catalyst 21 decreases with respect to target three-way catalyst temperature point Ttt, or as temperature Tg of GPF 22 decreases with respect to target GPF temperature point Tgt. Namely, the exhaust gas temperature increase control of the sixth embodiment sets the ignition timing of internal combustion engine 1 more retarded than the normal control, as temperature Tt of three-way catalyst 21 decreases with respect to target three-way catalyst temperature point Ttt, or as temperature Tg of GPF 22 decreases with respect to target GPF temperature point Tgt.

Figure 15:
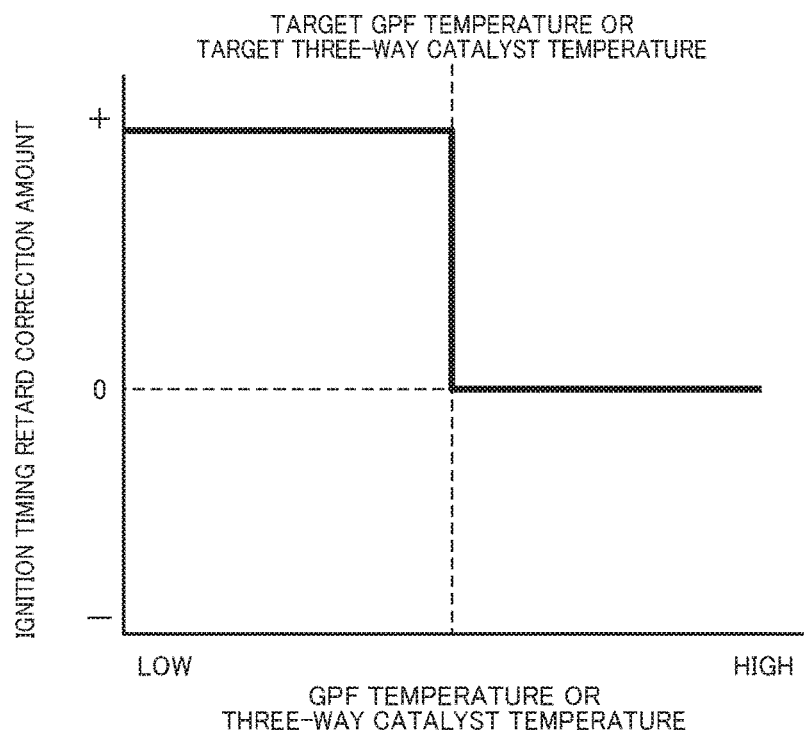
FIG. 15 is an explanatory diagram showing an example of relationship between ignition timing retard correction amount and GPF temperature or three-way catalyst temperature according to the sixth embodiment.

The ignition timing retard correction amount for the exhaust gas temperature increase control may be set as shown in FIG. 15. In FIG. 15, when temperature Tt of three-way catalyst 21 is lower than or equal to target three-way catalyst temperature point Ttt, or when temperature Tg of GPF 22 is lower than or equal to target GPF temperature point Tgt, the ignition timing retard correction amount for the exhaust gas temperature increase control is set to a preset constant value with respect to temperature Tg of GPF 22. In this way, when temperature Tt of three-way catalyst 21 is lower than or equal to target three-way catalyst temperature point Ttt, or when temperature Tg of GPF 22 is lower than or equal to target GPF temperature point Tgt, the ignition timing retard amount for the exhaust gas temperature increase control may be set to a preset constant value regardless of temperature Tt of three-way catalyst 21 and temperature Tg of GPF 22.

Figure 16:
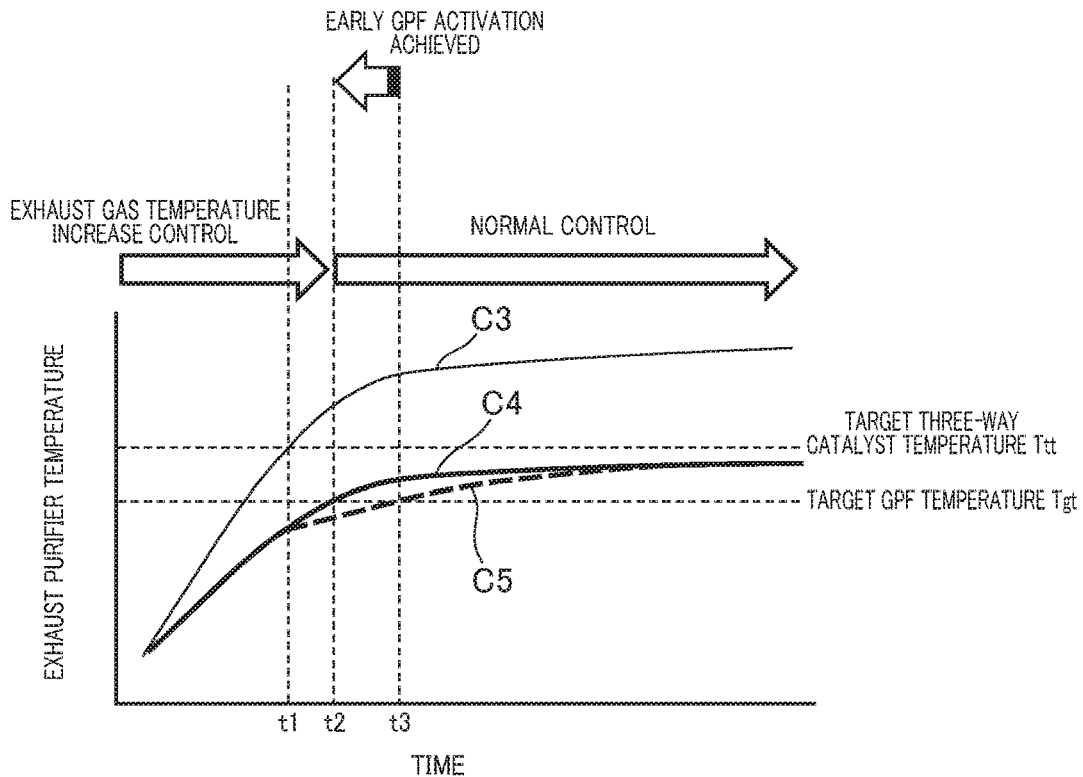
FIG. 16 is an explanatory diagram showing characteristics of increase of the three-way catalyst temperature and GPF temperature during an exhaust gas temperature increase control.

FIG. 16 is an explanatory diagram showing characteristics of temperature increase of three-way catalyst 21 and GPF 22 during the exhaust gas temperature increase control.

In FIG. 16, a characteristic line C3 in a narrow solid line form indicates characteristics of the temperature of three-way catalyst 21 in a case that the exhaust gas temperature increase control is performed immediately after internal combustion engine 1 is started. In FIG. 16, a characteristic line C4 in a solid line form indicates characteristics of the temperature of GPF 22 in the case that the exhaust gas temperature increase control is performed immediately after internal combustion engine 1 is started. In FIG. 16, a characteristic line C5 in a broken line form indicates characteristics of the temperature of GPF 22 in a case that the exhaust gas temperature increase control is not performed after internal combustion engine 1 is started. Namely, characteristic line C5 indicates characteristics of the temperature of GPF 22 when the normal control is solely performed after internal combustion engine 1 is started.

In the case that the exhaust gas temperature increase control is performed immediately after the start of internal combustion engine 1, temperature Tt of three-way catalyst 21 gets equal to target three-way catalyst temperature point Ttt at a time instant t1. At time instant t1, temperature Tg of GPF 22 has not increased up to target GPF temperature point Tgt. Accordingly, the exhaust gas temperature increase control is continued until a time instant t2 when temperature Tg of GPF 22 gets equal to target GPF temperature point Tgt. After time instant t2, characteristic lines C3 and C4 indicate behavior after a shift from the exhaust gas temperature increase control to the normal control.

As shown in FIG. 16, in the case that the normal control is solely performed after the start of internal combustion engine 1, the temperature of GPF 22 does not reach target GPF temperature point Tgt before a time instant t3 after time instant t2.

In this way, when temperature Tt of three-way catalyst 21 or temperature Tg of GPF 22 is low, by executing the exhaust gas temperature increase control after internal combustion engine 1 is started, each of the temperature of three-way catalyst 21 and the temperature of GPF 22 can be quickly increased to the corresponding target temperature point. Therefore, the execution of the exhaust gas temperature increase control serves to activate three-way catalyst 21 and GPF 22 as quickly as possible, and reduce CO, HC, NOx contained in the exhaust gas, and reduce the particulate number (PN) indicating the amount of emission of exhaust particulate matter.

Figure 17:
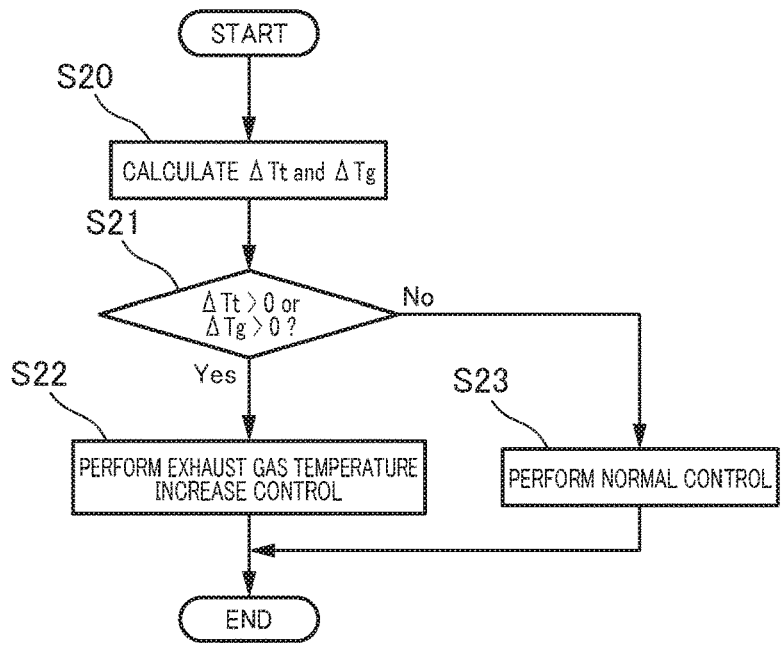
FIG. 17 is a flowchart showing a flow of exhaust purifier temperature control according to the sixth embodiment.

FIG. 17 is a flowchart showing a flow of exhaust purifier temperature control according to the sixth embodiment described above.

At Step S20, it calculates a temperature difference ΔTt by subtracting a current value of temperature Tt of three-way catalyst 21 from target three-way catalyst temperature point Ttt, and calculates temperature difference ΔTg by subtracting a current value of temperature Tg of GPF 22 from target GPF temperature point Tgt.

At Step S21, it determines whether or not temperature difference ΔTt is greater than zero, and whether or not temperature difference ΔTg is greater than zero. When temperature difference ΔTt or temperature difference ΔTg is greater than zero, the process proceeds to Step S22. When both of temperature difference ΔTt and temperature difference ΔTg are less than or equal to zero, the process proceeds to Step S23. At Step S22, it performs the exhaust gas temperature increase control. At Step S23, it performs the normal control.

The following describes an exhaust purifier temperature control method and a control device for internal combustion engine 1 according to a seventh embodiment.

The seventh embodiment is similar in configuration to the sixth embodiment. However, the exhaust gas temperature increase control of the seventh embodiment employs, as a manipulated variable, secondary air supplied to the upstream side of three-way catalyst 21, instead of the ignition timing, wherein the manipulated variable is to be manipulated to increase the temperature Tt of three-way catalyst 21 and temperature Tg of GPF 22.

Figure 18:
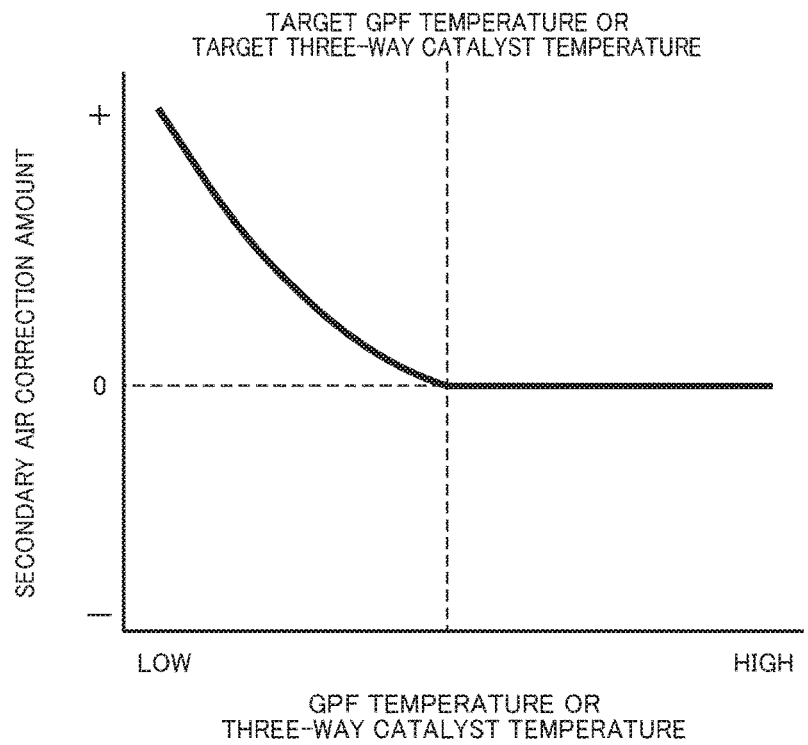
FIG. 18 is an explanatory diagram showing an example of relationship between secondary air correction amount and GPF temperature or three-way catalyst temperature according to a seventh embodiment.

The exhaust gas temperature increase control of the seventh embodiment is a control to supply a larger amount of secondary air to the upstream side of three-way catalyst 21 than the normal control, when temperature Tt of three-way catalyst 21 or temperature Tg of GPF 22 is low. Specifically, as shown in FIG. 18, a secondary air correction amount is set such that the secondary air correction amount increases to increase the amount of secondary air supplied to exhaust passage 3, as temperature Tt of three-way catalyst 21 decreases with respect to target three-way catalyst temperature point Ttt, or as temperature Tg of GPF 22 decreases with respect to target GPF temperature point Tgt. Namely, the exhaust gas temperature increase control of the seventh embodiment increases the amount of secondary air supplied to exhaust passage 3 more than the normal control, as temperature Tt of three-way catalyst 21 decreases with respect to target three-way catalyst temperature point Ttt, or as temperature Tg of GPF 22 decreases with respect to target GPF temperature point Tgt.

Figure 19:
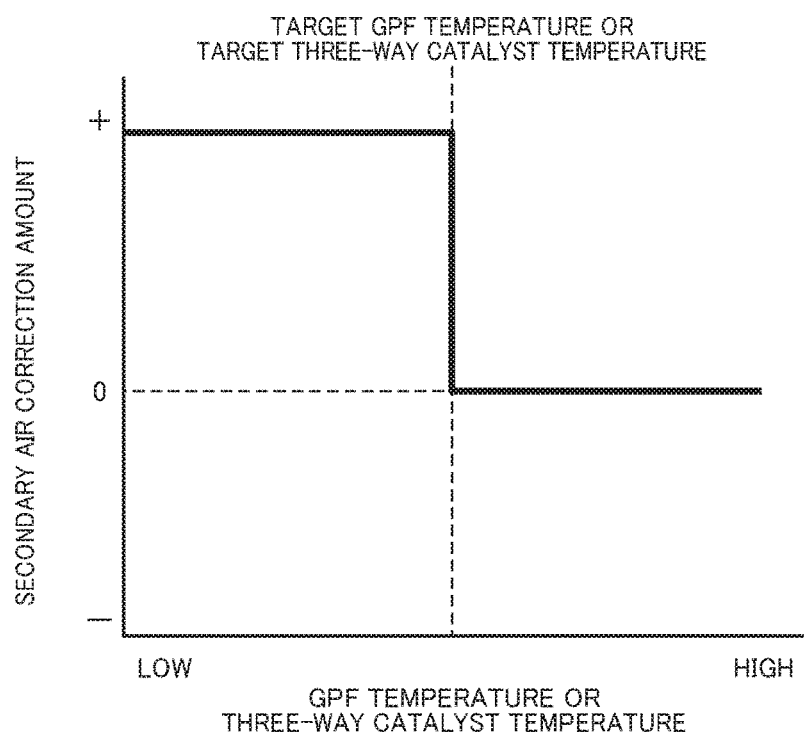
FIG. 19 is an explanatory diagram showing an example of relationship between secondary air correction amount and GPF temperature or three-way catalyst temperature according to the seventh embodiment.

The secondary air correction amount for the exhaust gas temperature increase control may be set as shown in FIG. 19. In FIG. 19, when temperature Tt of three-way catalyst 21 is lower than or equal to target three-way catalyst temperature point Ttt, or when temperature Tg of GPF 22 is lower than or equal to target GPF temperature point Tgt, the secondary air correction amount for the exhaust gas temperature increase control is set to a preset constant value with respect to temperature Tg of GPF 22. In this way, when temperature Tt of three-way catalyst 21 is lower than or equal to target three-way catalyst temperature point Ttt, or when temperature Tg of GPF 22 is lower than or equal to target GPF temperature point Tgt, the amount of secondary air supplied to exhaust passage 3 for the exhaust gas temperature increase control may be set to a preset constant value regardless of temperature Tt of three-way catalyst 21 and temperature Tg of GPF 22.

The seventh embodiment described above produces behavior and effects similar to those of the sixth embodiment.

The following describes an exhaust purifier temperature control method and a control device for internal combustion engine 1 according to an eighth embodiment.

The eighth embodiment is similar in configuration to the sixth embodiment. However, the exhaust gas temperature increase control of the eighth embodiment employs, as a manipulated variable, the degree of opening of wastegate valve 34 (wastegate valve opening), instead of the ignition timing, wherein the manipulated variable is to be manipulated to increase the temperature Tt of three-way catalyst 21 and temperature Tg of GPF 22.

Figure 20:
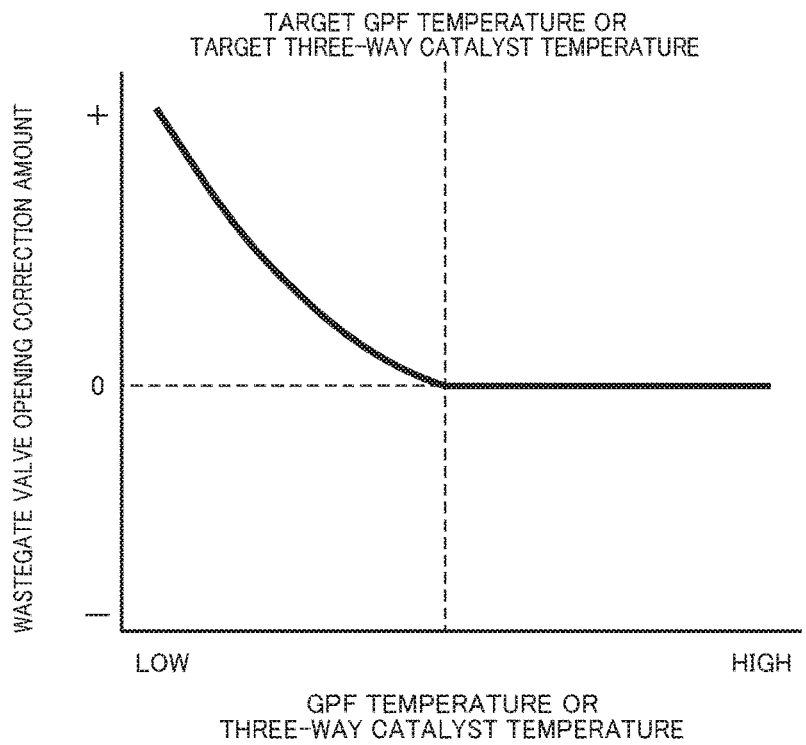
FIG. 20 is an explanatory diagram showing an example of relationship between wastegate valve opening correction amount and GPF temperature or three-way catalyst temperature according to an eighth embodiment.

The exhaust gas temperature increase control of the eighth embodiment is a control to set the opening degree of wastegate valve 34 greater than the normal control, when temperature Tt of three-way catalyst 21 or temperature Tg of GPF 22 is low. Specifically, as shown in FIG. 20, a wastegate valve opening correction amount is set such that the wastegate valve opening correction amount increases to increase the opening degree of wastegate valve 34, as temperature Tt of three-way catalyst 21 decreases with respect to target three-way catalyst temperature point Ttt, or as temperature Tg of GPF 22 decreases with respect to target GPF temperature point Tgt. Namely, the exhaust gas temperature increase control of the eighth embodiment increases the opening degree of wastegate valve 34 more than the normal control, as temperature Tt of three-way catalyst 21 decreases with respect to target three-way catalyst temperature point Ttt, or as temperature Tg of GPF 22 decreases with respect to target GPF temperature point Tgt.

Figure 21:
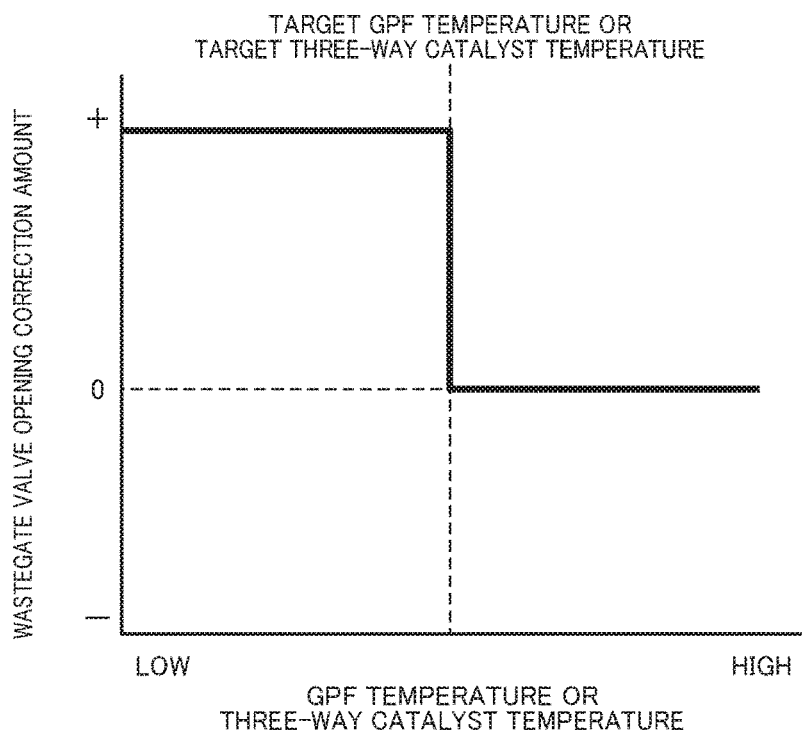
FIG. 21 is an explanatory diagram showing an example of relationship between wastegate valve opening correction amount and GPF temperature or three-way catalyst temperature according to the eighth embodiment.

The wastegate valve opening correction amount for the exhaust gas temperature increase control may be set as shown in FIG. 21. In FIG. 21, when temperature Tt of three-way catalyst 21 is lower than or equal to target three-way catalyst temperature point Ttt, or when temperature Tg of GPF 22 is lower than or equal to target GPF temperature point Tgt, the wastegate valve opening correction amount for the exhaust gas temperature increase control is set to a preset constant value with respect to temperature Tg of GPF 22. In this way, when temperature Tt of three-way catalyst 21 is lower than or equal to target three-way catalyst temperature point Ttt, or when temperature Tg of GPF 22 is lower than or equal to target GPF temperature point Tgt, the opening degree of wastegate valve 34 for the exhaust gas temperature increase control may be set to a preset constant value regardless of temperature Tt of three-way catalyst 21 and temperature Tg of GPF 22.

The eighth embodiment described above produces behavior and effects similar to those of the sixth embodiment.

The following describes an exhaust purifier temperature control method and a control device for internal combustion engine 1 according to a ninth embodiment.

The ninth embodiment is similar in configuration to the sixth embodiment. However, the exhaust gas temperature increase control of the ninth embodiment employs, as a manipulated variable, the engine speed of internal combustion engine 1, instead of the ignition timing, wherein the manipulated variable is to be manipulated to increase the temperature Tt of three-way catalyst 21 and temperature Tg of GPF 22.

Figure 22:
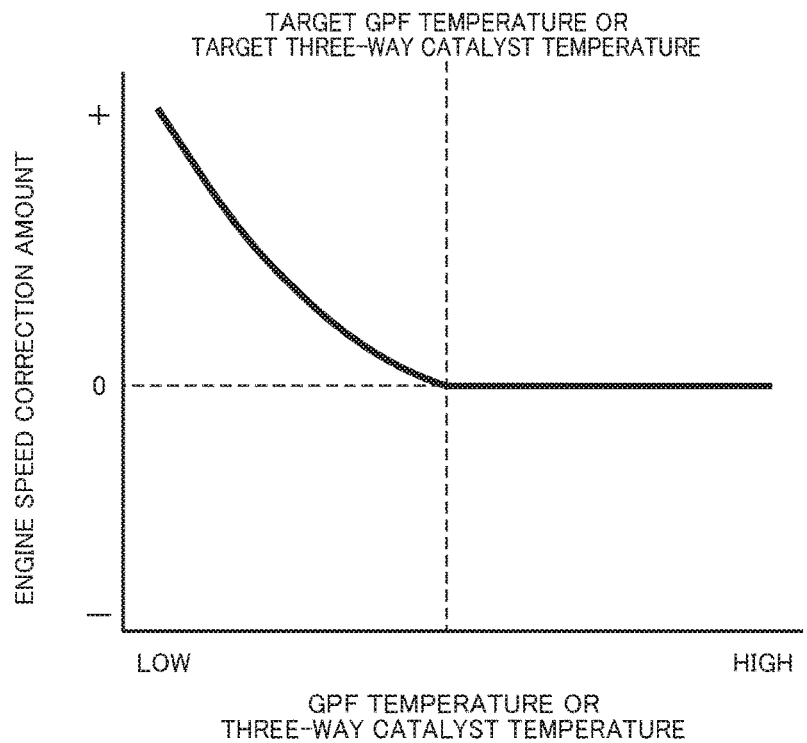
FIG. 22 is an explanatory diagram showing an example of relationship between engine speed correction amount and GPF temperature or three-way catalyst temperature according to a ninth embodiment.

The exhaust gas temperature increase control of the ninth embodiment is a control to set the engine speed of internal combustion engine 1 greater than the normal control, when temperature Tt of three-way catalyst 21 or temperature Tg of GPF 22 is low. Specifically, as shown in FIG. 22, an engine speed correction amount is set such that the engine speed correction amount increases to increase the engine speed of internal combustion engine 1, as temperature Tt of three-way catalyst 21 decreases with respect to target three-way catalyst temperature point Ttt, or as temperature Tg of GPF 22 decreases with respect to target GPF temperature point Tgt. Namely, the exhaust gas temperature increase control of the ninth embodiment increases the engine speed of internal combustion engine 1 more than the normal control, as temperature Tt of three-way catalyst 21 decreases with respect to target three-way catalyst temperature point Ttt, or as temperature Tg of GPF 22 decreases with respect to target GPF temperature point Tgt.

Figure 23:
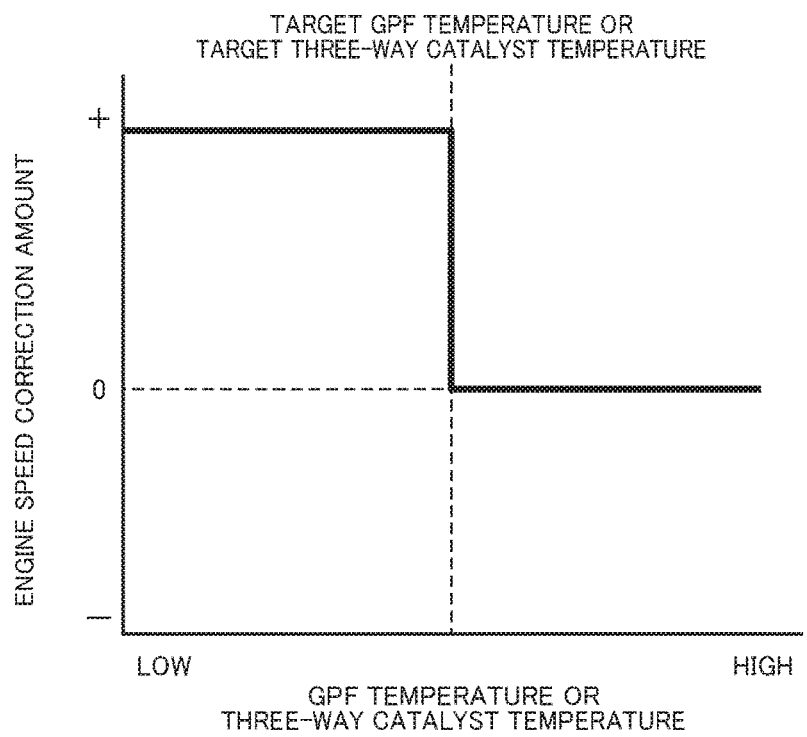
FIG. 23 is an explanatory diagram showing an example of relationship between engine speed correction amount and GPF temperature or three-way catalyst temperature according to the ninth embodiment.

The engine speed correction amount for the exhaust gas temperature increase control may be set as shown in FIG. 23. In FIG. 23, when temperature Tt of three-way catalyst 21 is lower than or equal to target three-way catalyst temperature point Ttt, or when temperature Tg of GPF 22 is lower than or equal to target GPF temperature point Tgt, the engine speed correction amount for the exhaust gas temperature increase control is set to a preset constant value with respect to temperature Tg of GPF 22. In this way, when temperature Tt of three-way catalyst 21 is lower than or equal to target three-way catalyst temperature point Ttt, or when temperature Tg of GPF 22 is lower than or equal to target GPF temperature point Tgt, the engine speed of internal combustion engine 1 for the exhaust gas temperature increase control may be set to a preset constant value regardless of temperature Tt of three-way catalyst 21 and temperature Tg of GPF 22.

The ninth embodiment described above produces behavior and effects similar to those of the sixth embodiment.

The following describes an exhaust purifier temperature control method and a control device for internal combustion engine 1 according to a tenth embodiment.

The tenth embodiment is similar in configuration to the sixth embodiment. However, the exhaust gas temperature increase control of the tenth embodiment employs a plurality of manipulated variables to be manipulated to increase the temperature Tt of three-way catalyst 21 and temperature Tg of GPF 22. Specifically, in the tenth embodiment, the manipulated variables to be manipulated to increase the temperature Tt of three-way catalyst 21 and temperature Tg of GPF 22 include the ignition timing, the amount of secondary air supplied to the upstream side of three-way catalyst 21, the degree of opening of wastegate valve 34 (wastegate valve opening), and the engine speed of internal combustion engine 1.

Figure 24:
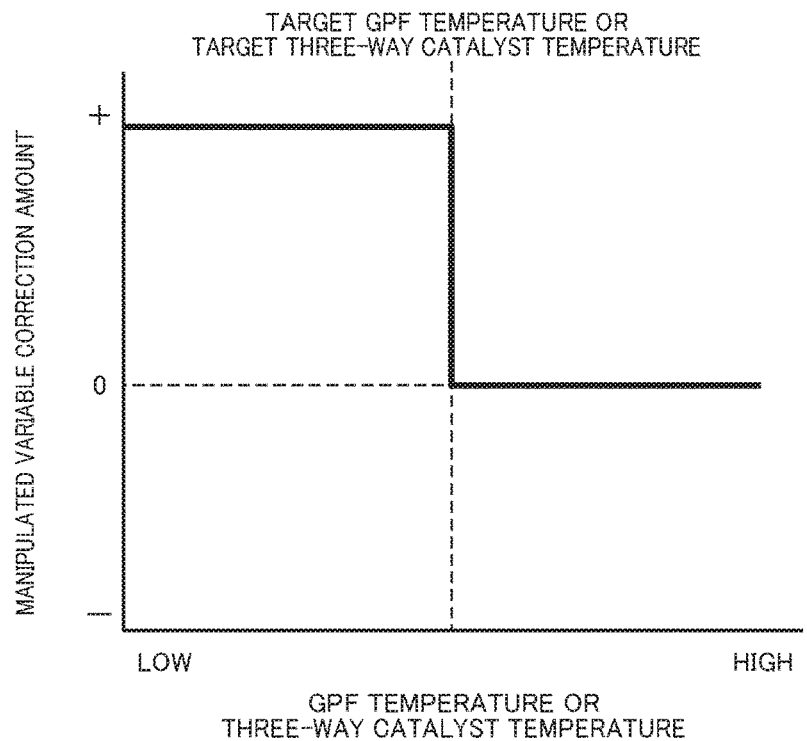
FIG. 24 is an explanatory diagram showing an example of relationship between manipulation amount of manipulated variable and GPF temperature or three-way catalyst temperature according to a tenth embodiment.

The exhaust gas temperature increase control of the tenth embodiment is a control to set the ignition timing of internal combustion engine 1 more retarded, supply a larger amount of secondary air to the upstream side of GPF 22, set the opening degree of wastegate valve 34 greater, and set the engine speed of internal combustion engine 1 greater, than the normal control, when temperature Tt of three-way catalyst 21 or temperature Tg of GPF 22 is low. Specifically, as shown in FIG. 24, when temperature Tt of three-way catalyst 21 is lower than or equal to target three-way catalyst temperature point Ttt, or when temperature Tg of GPF 22 is lower than or equal to target GPF temperature point Tgt, a correction amount of each manipulated variable (ignition timing, secondary air, wastegate valve opening, and engine speed) is set to a preset constant value with respect to temperature Tt of three-way catalyst 21 or temperature Tg of GPF 22. In this way, when temperature Tg of GPF 22 is lower than or equal to target GPF temperature point Tgt, a manipulation amount of each manipulated variable (ignition timing, secondary air, wastegate valve opening, and engine speed) for the exhaust gas temperature increase control is set to a preset constant value regardless of temperature Tt of three-way catalyst 21 and temperature Tg of GPF 22.

In the tenth embodiment, the correction amount of each manipulated variable (ignition timing, secondary air, wastegate valve opening, and engine speed) for the exhaust gas temperature increase control may be set such that the correction amount increases as temperature Tt of three-way catalyst 21 decreases with respect to target three-way catalyst temperature point Ttt, or as temperature Tg of GPF 22 decreases with respect to target GPF temperature point Tgt. In this way, the exhaust gas temperature increase control of the tenth embodiment may set greater the manipulation amount of each manipulated variable (ignition timing, secondary air, waste gate valve opening, and engine speed) than the normal control, as temperature Tt of three-way catalyst 21 decreases with respect to target three-way catalyst temperature point Ttt, or as temperature Tg of GPF 22 decreases with respect to target GPF temperature point Tgt.

The tenth embodiment described above produces behavior and effects similar to those of the sixth embodiment.

As described above, the GPF collection efficiency correlates with temperature Tg of GPF 22, the particle diameter of the exhaust particulate matter, and the space velocity of the exhaust gas flowing through the GPF 22. Accordingly, the manipulated variables employed for the exhaust gas temperature increase control may be determined in consideration of the GPF collection efficiency during the exhaust gas temperature increase control.

Specifically, for the exhaust gas temperature increase control of the tenth embodiment in which the manipulated variables are manipulated, one of the manipulated variables that is advantageous in improving the GPF collection efficiency may be selected with priority.

Furthermore, for the exhaust gas temperature increase control of the tenth embodiment in which the manipulated variables are manipulated, it is desirable to select, as one of the manipulated variables, the ignition timing that most contributes to increase in temperature Tt of three-way catalyst 21.

The following describes an exhaust purifier temperature control method and a control device for internal combustion engine 1 according to an eleventh embodiment.

The eleventh embodiment is similar in configuration to the sixth embodiment. However, the exhaust gas temperature increase control of the eleventh embodiment employs a plurality of manipulated variables to be manipulated to increase the temperature Tt of three-way catalyst 21 and temperature Tg of GPF 22. Specifically, in the eleventh embodiment, the manipulated variables to be manipulated to increase the temperature Tt of three-way catalyst 21 and temperature Tg of GPF 22 include the ignition timing, the amount of secondary air supplied to the upstream side of three-way catalyst 21, the degree of opening of wastegate valve 34 (wastegate valve opening), and the engine speed of internal combustion engine 1.

Furthermore, the exhaust gas temperature increase control is composed of a catalyst temperature increase control and a filter temperature increase control.

The catalyst temperature increase control is a control to increase the temperature of the exhaust gas so as to set the temperature Tt of three-way catalyst 21 higher than or equal to target three-way catalyst temperature point Ttt as a second preset temperature point, when temperature Tt of three-way catalyst 21 is low.

The catalyst temperature increase control employs, as manipulated variables, the ignition timing, the amount of secondary air supplied to the upstream side of three-way catalyst 21, the degree of opening of wastegate valve 34 (wastegate valve opening), and the engine speed of internal combustion engine 1, wherein the manipulated variables are to be manipulated to increase the temperature Tt of three-way catalyst 21.

The catalyst temperature increase control is a control to set the ignition timing of internal combustion engine 1 more retarded, supply a larger amount of secondary air to the upstream side of GPF 22, set the opening degree of wastegate valve 34 greater, and set the engine speed of internal combustion engine 1 greater, than the normal control.

The filter temperature increase control is a control to increase the temperature of the exhaust gas so as to set the temperature Tg of GPF 22 higher than or equal to target GPF temperature point Tgt as a first preset temperature point, when temperature Tg of GPF 22 is low.

The filter temperature increase control employs, as manipulated variables, the ignition timing, the amount of secondary air supplied to the upstream side of three-way catalyst 21, the degree of opening of wastegate valve 34 (wastegate valve opening), and the engine speed of internal combustion engine 1, wherein the manipulated variables are to be manipulated to increase the temperature Tg of GPF 22.

The filter temperature increase control is a control to set the ignition timing of internal combustion engine 1 more retarded, supply a larger amount of secondary air to the upstream side of GPF 22, set the opening degree of wastegate valve 34 greater, and set the engine speed of internal combustion engine 1 greater, than the normal control.

The exhaust gas temperature increase control is implemented by performing the filter temperature increase control after performing the catalyst temperature increase control. Accordingly, if temperature Tg of GPF 22 is higher than or equal to target GPF temperature point Tgt when the catalyst temperature increase control is terminated, the exhaust gas temperature increase control is terminated without execution of the filter temperature increase control.

Figure 25:
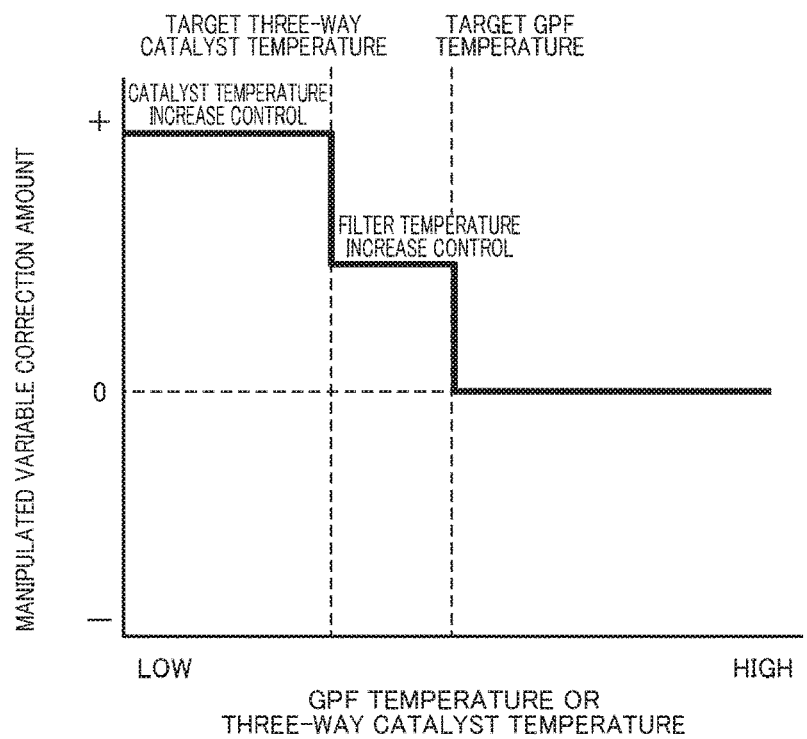
FIG. 25 is an explanatory diagram showing an example of relationship between manipulation amount of manipulated variable and GPF temperature or three-way catalyst temperature according to an eleventh embodiment.

As shown in FIG. 25, the correction amount of each manipulated variable for the catalyst temperature increase control is set greater than that for the filter temperature increase control.

During the catalyst temperature increase control, when temperature Tt of three-way catalyst 21 is lower than or equal to target three-way catalyst temperature point Ttt, the correction amount of each manipulated variable (ignition timing, secondary air, wastegate valve opening, and engine speed) is set to a preset constant value with respect to temperature Tt of three-way catalyst 21. In this way, when temperature Tt of three-way catalyst 21 is lower than or equal to target three-way catalyst temperature point Ttt, a manipulation amount of each manipulated variable (ignition timing, secondary air, wastegate valve opening, and engine speed) for the exhaust gas temperature increase control is set to a preset constant value regardless of temperature Tt of three-way catalyst 21.

During the filter temperature increase control, when temperature Tg of GPF 22 is lower than or equal to target GPF temperature point Tgt, the correction amount of each manipulated variable (ignition timing, secondary air, wastegate valve opening, and engine speed) is set to a preset constant value with respect to temperature Tg of GPF 22. In this way, when temperature Tg of GPF 22 is lower than or equal to target GPF temperature point Tgt, a manipulation amount of each manipulated variable (ignition timing, secondary air, wastegate valve opening, and engine speed) for the exhaust gas temperature increase control is set to a preset constant value regardless of temperature Tg of GPF 22.

In the eleventh embodiment, the correction amount of each manipulated variable (ignition timing, secondary air, wastegate valve opening, and engine speed) for the catalyst temperature increase control and filter temperature increase control may be set such that the correction amount increases as temperature Tt of three-way catalyst 21 decreases with respect to target three-way catalyst temperature point Ttt, or as temperature Tg of GPF 22 decreases with respect to target GPF temperature point Tgt. In this way, the exhaust gas temperature increase control of the eleventh embodiment may set greater the manipulation amount of each manipulated variable (ignition timing, secondary air, waste gate valve opening, and engine speed) than the normal control, as temperature Tt of three-way catalyst 21 decreases with respect to target three-way catalyst temperature point Ttt, or as temperature Tg of GPF 22 decreases with respect to target GPF temperature point Tgt.

Figure 26:
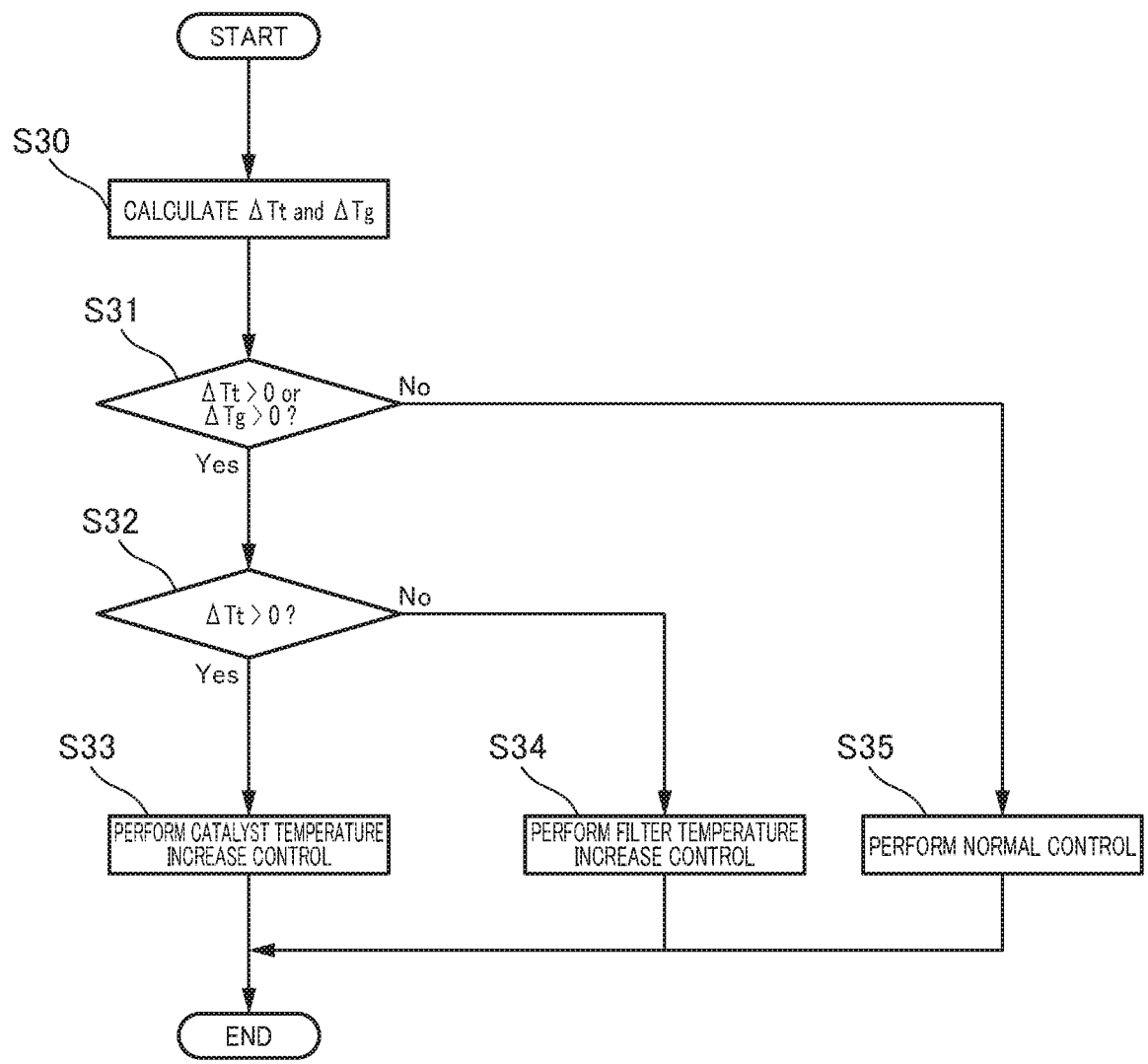
FIG. 26 is a flowchart showing a flow of exhaust purifier temperature control according to the eleventh embodiment.

FIG. 26 is a flowchart showing a flow of exhaust purifier temperature control according to the eleventh embodiment described above.

At Step S30, it calculates temperature difference ΔTt by subtracting a current value of temperature Tt of three-way catalyst 21 from target three-way catalyst temperature point Ttt, and calculates temperature difference ΔTg by subtracting a current value of temperature Tg of GPF 22 from target GPF temperature point Tgt.

At Step S31, it determines whether or not temperature difference ΔTt is greater than zero, and whether or not temperature difference ΔTg is greater than zero. When temperature difference ΔTt or temperature difference ΔTg is greater than zero, the process proceeds to Step S32. When both of temperature difference ΔTt and temperature difference ΔTg are less than or equal to zero, the process proceeds to Step S35.

At Step S32, it determines whether or not temperature difference ΔTt is greater than zero. When temperature difference ΔTt is greater than zero, the process proceeds to Step S33. When temperature difference ΔTt is less than or equal to zero, the process proceeds to Step S34.

At Step S33, it performs the catalyst temperature increase control according to the eleventh embodiment. At Step S34, it performs the filter temperature increase control according to the eleventh embodiment. At Step S25, it performs the normal control.

The eleventh embodiment described above produces behavior and effects similar to those of the sixth embodiment.

As described above, the GPF collection efficiency correlates with temperature Tg of GPF 22, the particle diameter of the exhaust particulate matter, and the space velocity of the exhaust gas flowing through the GPF 22. Accordingly, the manipulated variables employed for the filter temperature increase control may be determined in consideration of the GPF collection efficiency during the filter temperature increase control.

Specifically, for the filter temperature increase control of the eleventh embodiment in which the manipulated variables are manipulated, one of the manipulated variables that is advantageous in improving the GPF collection efficiency may be selected with priority.

Furthermore, for the catalyst temperature increase control of the eleventh embodiment in which the manipulated variables are manipulated, it is desirable to select, as one of the manipulated variables, the ignition timing that most contributes to increase in temperature Tt of three-way catalyst 21.

The following describes an exhaust purifier temperature control method and a control device for internal combustion engine 1 according to a twelfth embodiment.

The twelfth embodiment is similar in configuration to the sixth embodiment. However, the exhaust gas temperature increase control of the twelfth embodiment employs a plurality of manipulated variables to be manipulated to increase the temperature Tt of three-way catalyst 21 and temperature Tg of GPF 22. Specifically, in the twelfth embodiment, the manipulated variables to be manipulated to increase the temperature Tt of three-way catalyst 21 and temperature Tg of GPF 22 include the ignition timing, the amount of secondary air supplied to the upstream side of three-way catalyst 21, the degree of opening of wastegate valve 34 (wastegate valve opening), and the engine speed of internal combustion engine 1.

Furthermore, the exhaust gas temperature increase control is composed of a catalyst temperature increase control and a filter temperature increase control.

The catalyst temperature increase control is a control to increase the temperature of the exhaust gas so as to set the temperature Tt of three-way catalyst 21 higher than or equal to target three-way catalyst temperature point Ttt as a second preset temperature point, when temperature Tt of three-way catalyst 21 is low.

The catalyst temperature increase control employs, as manipulated variables, the ignition timing, the amount of secondary air supplied to the upstream side of three-way catalyst 21, the degree of opening of wastegate valve 34 (wastegate valve opening), and the engine speed of internal combustion engine 1, wherein the manipulated variables are to be manipulated to increase the temperature Tt of three-way catalyst 21.

The catalyst temperature increase control is a control to set the ignition timing of internal combustion engine 1 more retarded, supply a larger amount of secondary air to the upstream side of GPF 22, set the opening degree of wastegate valve 34 greater, and set the engine speed of internal combustion engine 1 greater, than the normal control.

The filter temperature increase control is a control to increase the temperature of the exhaust gas so as to set the temperature Tg of GPF 22 higher than or equal to target GPF temperature point Tgt as a first preset temperature point, when temperature Tg of GPF 22 is low.

The filter temperature increase control employs, as manipulated variables, the ignition timing, the amount of secondary air supplied to the upstream side of three-way catalyst 21, the degree of opening of wastegate valve 34 (wastegate valve opening), and the engine speed of internal combustion engine 1, wherein the manipulated variables are to be manipulated to increase the temperature Tg of GPF 22.

The filter temperature increase control is a control to set the ignition timing of internal combustion engine 1 more retarded, supply a larger amount of secondary air to the upstream side of GPF 22, set the opening degree of wastegate valve 34 greater, and set the engine speed of internal combustion engine 1 greater, than the normal control.

In the twelfth embodiment, while the exhaust gas temperature increase control is performed, a catalyst temperature increasing correction amount P1 as a first determination value is compared with a filter temperature increasing correction amount P2 as a second determination value.

Filter temperature increasing correction amount P2 is a correction amount of a manipulated variable that is determined in accordance with temperature difference $\Delta Tg$ obtained by subtracting a current value of temperature Tg of GPF 22 from target GPF temperature point Tgt. Filter temperature increasing correction amount P2 is set to increase as temperature difference $\Delta Tg$ increases.

Catalyst temperature increasing correction amount P1 is a correction amount of a manipulated variable that is determined in accordance with temperature difference $\Delta Tt$ obtained by subtracting a current value of temperature Tt of three-way catalyst 21 from target three-way catalyst temperature Ttt. Catalyst temperature increasing correction amount P1 is set to increase as temperature difference $\Delta Tt$ increases.

Furthermore, the ratio of change in filter temperature increasing correction amount P2 with respect to temperature difference $\Delta Tg$ is set to be smaller than the ratio of change in catalyst temperature increasing correction amount P1 with respect to temperature difference $\Delta Tt$.

The exhaust gas temperature increase control is implemented by performing the catalyst temperature increase control, when a value obtained by subtracting the filter temperature increasing correction amount P2 from catalyst temperature increasing correction amount P1 is greater than zero. In other words, the exhaust gas temperature increase control is implemented by performing the exhaust gas temperature increase control employing the catalyst temperature increasing correction amount P1, when the value obtained by subtracting the filter temperature increasing correction amount P2 from catalyst temperature increasing correction amount P1 is greater than zero.

The exhaust gas temperature increase control is implemented by performing the filter temperature increase control, when the value obtained by subtracting the filter temperature increasing correction amount P2 from catalyst temperature increasing correction amount P1 is less than or equal to zero. In other words, the exhaust gas temperature increase control is implemented by performing the exhaust gas temperature increase control employing the filter temperature increasing correction amount P2, when the value obtained by subtracting the filter temperature increasing correction amount P2 from catalyst temperature increasing correction amount P1 is less than or equal to zero.

Namely, the exhaust gas temperature increase control of the twelfth embodiment is implemented by comparing the catalyst temperature increasing correction amount P1 with the filter temperature increasing correction amount P2, and increasing the temperature of the exhaust gas using the greater one.

Figure 27:
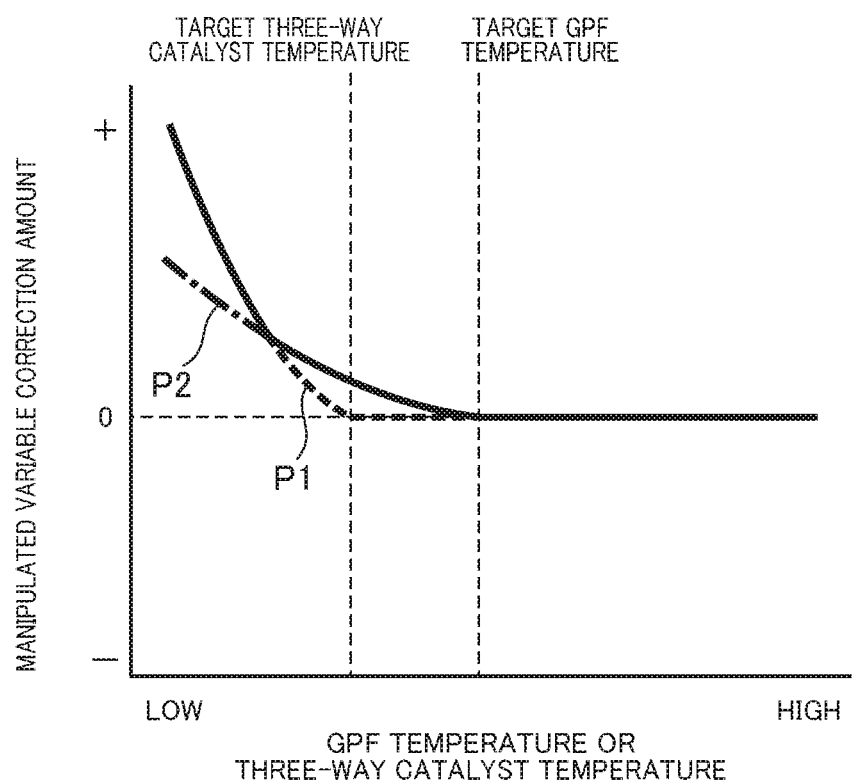
FIG. 27 is an explanatory diagram showing an example of relationship between manipulation amount of manipulated variable and GPF temperature or three-way catalyst temperature according to a twelfth embodiment.

FIG. 27 shows an example in which the filter temperature increase control is performed after the catalyst temperature increase control is performed. In FIG. 27, a broken line indicates catalyst temperature increasing correction amount P1, and a chain line indicates filter temperature increasing correction amount P2, and a solid line indicates the larger one of catalyst temperature increasing correction amount P1 and filter temperature increasing correction amount P2. In the twelfth embodiment, the exhaust gas temperature increase control is performed using the correction amount defined by the solid line in FIG. 27.

In the example shown in FIG. 27, temperature Tt of three-way catalyst 21 has not reached the second preset temperature point Ttt when the filter temperature increase control is started.

Figure 28:
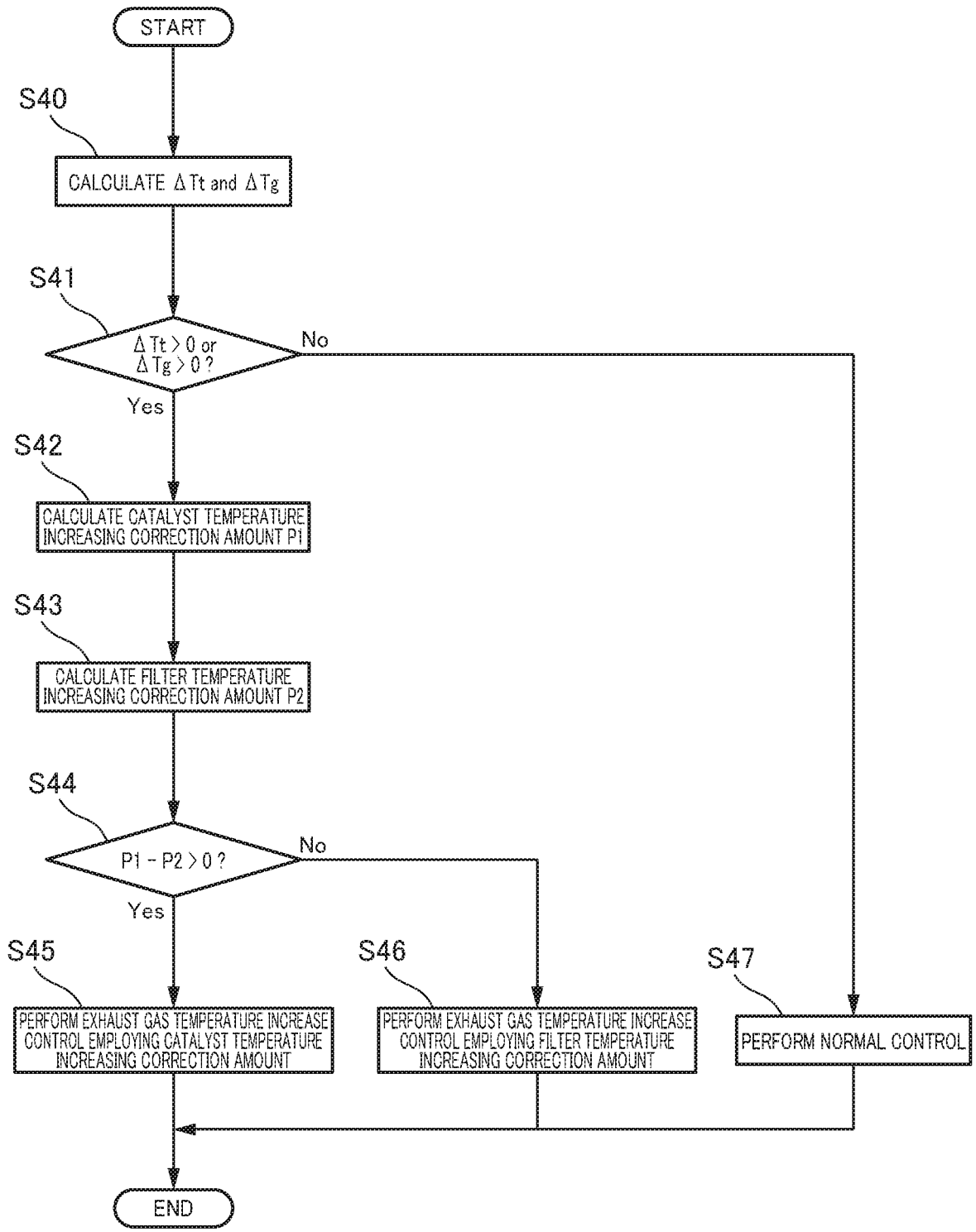
FIG. 28 is a flowchart showing a flow of exhaust purifier temperature control according to the twelfth embodiment.

FIG. 28 is a flowchart showing a flow of exhaust purifier temperature control according to the twelfth embodiment described above.

At Step S40, it calculates temperature difference $\Delta Tt$ by subtracting a current value of temperature Tt of three-way catalyst 21 from target three-way catalyst temperature point Ttt, and calculates temperature difference $\Delta Tg$ by subtracting a current value of temperature Tg of GPF 22 from target GPF temperature point Tgt.

At Step S41, it determines whether or not temperature difference $\Delta Tt$ is greater than zero, and whether or not temperature difference $\Delta Tg$ is greater than zero. When temperature difference $\Delta Tt$ or temperature difference $\Delta Tg$ is greater than zero, the process proceeds to Step S42. When both of temperature difference ΔTt and temperature difference ΔTg are less than or equal to zero, the process proceeds to Step S47.

At Step S42, it calculates catalyst temperature increasing correction amount P1.

At Step S43, it calculates filter temperature increasing correction amount P2.

At Step S44, it determines whether or not the value obtained by subtracting the filter temperature increasing correction amount P2 from catalyst temperature increasing correction amount P1 is greater than zero. When the value obtained by subtracting the filter temperature increasing correction amount P2 from catalyst temperature increasing correction amount P1 is greater than zero, the process proceeds to Step S45. When the value obtained by subtracting the filter temperature increasing correction amount P2 from catalyst temperature increasing correction amount P1 is less than or equal to zero, the process proceeds to Step S46.

At Step S45, it performs the exhaust gas temperature increase control employing the catalyst temperature increasing correction amount P1. At Step S46, it performs the exhaust gas temperature increase control employing the filter temperature increasing correction amount P2. At Step S47, it performs the normal control.

The twelfth embodiment described above produces behavior and effects similar to those of the sixth embodiment.

As described above, the GPF collection efficiency correlates with temperature Tg of GPF 22, the particle diameter of the exhaust particulate matter, and the space velocity of the exhaust gas flowing through the GPF 22. Accordingly, the manipulated variables employed for the filter temperature increase control may be determined in consideration of the GPF collection efficiency during the filter temperature increase control.

Specifically, for the filter temperature increase control of the twelfth embodiment in which the manipulated variables are manipulated, one of the manipulated variables that is advantageous in improving the GPF collection efficiency may be selected with priority.

Furthermore, for the catalyst temperature increase control of the twelfth embodiment in which the manipulated variables are manipulated, it is desirable to select, as one of the manipulated variables, the ignition timing that most contributes to increase in temperature Tt of three-way catalyst 21.

The following describes an exhaust purifier temperature control method and a control device for internal combustion engine 1 according to a thirteenth embodiment.

The thirteenth embodiment is similar in configuration to the sixth embodiment. However, the exhaust gas temperature increase control of the thirteenth embodiment employs a plurality of manipulated variables to be manipulated to increase the temperature Tt of three-way catalyst 21 and temperature Tg of GPF 22. Specifically, in the thirteenth embodiment, the manipulated variables to be manipulated to increase the temperature Tt of three-way catalyst 21 and temperature Tg of GPF 22 include the ignition timing, the amount of secondary air supplied to the upstream side of three-way catalyst 21, the degree of opening of wastegate valve 34 (wastegate valve opening), and the engine speed of internal combustion engine 1.

Furthermore, the exhaust gas temperature increase control is composed of a catalyst temperature increase control and a filter temperature increase control.

The catalyst temperature increase control is a control to increase the temperature of the exhaust gas so as to set the temperature Tt of three-way catalyst 21 higher than or equal to target three-way catalyst temperature point Ttt as a second preset temperature point, when temperature Tt of three-way catalyst 21 is low.

The catalyst temperature increase control employs, as manipulated variables, the ignition timing, the amount of secondary air supplied to the upstream side of three-way catalyst 21, the degree of opening of wastegate valve 34 (wastegate valve opening), and the engine speed of internal combustion engine 1, wherein the manipulated variables are to be manipulated to increase the temperature Tt of three-way catalyst 21.

The catalyst temperature increase control is a control to set the ignition timing of internal combustion engine 1 more retarded, supply a larger amount of secondary air to the upstream side of GPF 22, set the opening degree of wastegate valve 34 greater, and set the engine speed of internal combustion engine 1 greater, than the normal control.

The filter temperature increase control is a control to increase the temperature of the exhaust gas so as to set the temperature Tg of GPF 22 higher than or equal to target GPF temperature point Tgt as a first preset temperature point, when temperature Tg of GPF 22 is low.

The filter temperature increase control employs, as manipulated variables, the ignition timing, the amount of secondary air supplied to the upstream side of three-way catalyst 21, the degree of opening of wastegate valve 34 (wastegate valve opening), and the engine speed of internal combustion engine 1, wherein the manipulated variables are to be manipulated to increase the temperature Tg of GPF 22.

The filter temperature increase control is a control to set the ignition timing of internal combustion engine 1 more retarded, supply a larger amount of secondary air to the upstream side of GPF 22, set the opening degree of wastegate valve 34 greater, and set the engine speed of internal combustion engine 1 greater, than the normal control.

The exhaust gas temperature increase control is implemented by performing the filter temperature increase control after performing the catalyst temperature increase control. Accordingly, if temperature Tg of GPF 22 is higher than or equal to target GPF temperature point Tgt when the catalyst temperature increase control is terminated, the exhaust gas temperature increase control is terminated without execution of the filter temperature increase control.

Figure 29:
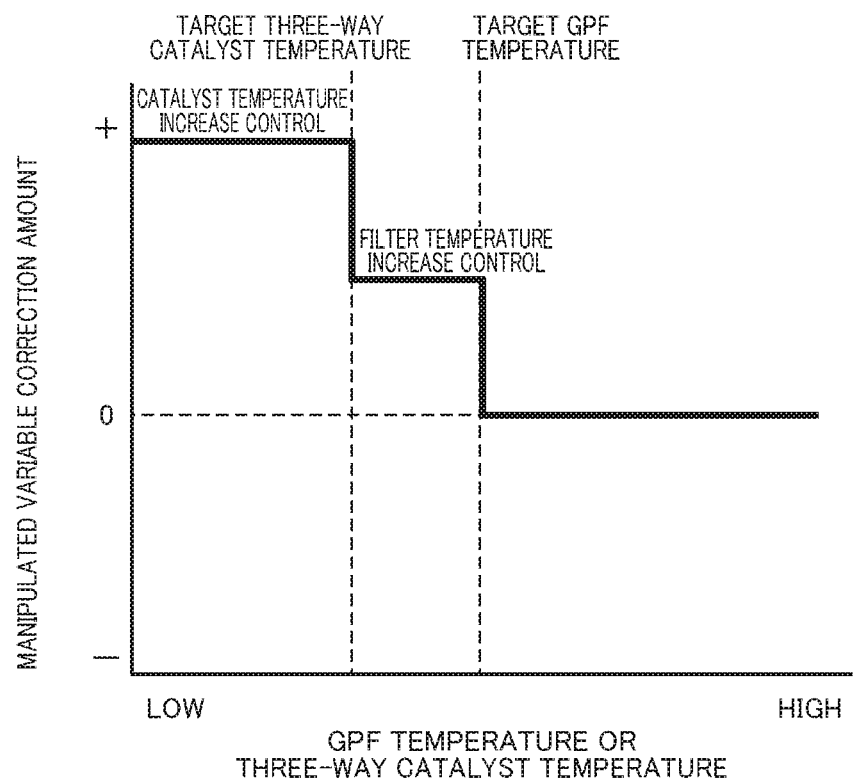
FIG. 29 is an explanatory diagram showing an example of relationship between manipulation amount of manipulated variable and GPF temperature or three-way catalyst temperature according to a thirteenth embodiment.

As shown in FIG. 29, the correction amount of each manipulated variable for the catalyst temperature increase control is set greater than that for the filter temperature increase control.

In the thirteenth embodiment, the number of manipulated variables for the catalyst temperature increase control is set to be larger than that for the filter temperature increase control. For example, the catalyst temperature increase control employs four manipulated variables including the ignition timing, secondary air, wastegate valve opening and engine speed, whereas the filter temperature increase control employs three manipulated variables including the ignition timing, secondary air, and wastegate valve opening.

During the catalyst temperature increase control, when temperature Tt of three-way catalyst 21 is lower than or equal to target three-way catalyst temperature point Ttt, the correction amount of each manipulated variable (for example, ignition timing, secondary air, wastegate valve opening, and engine speed) is set to a preset constant value with respect to temperature Tt of three-way catalyst 21. In this way, when temperature Tg of GPF 22 is lower than or equal to target GPF temperature point Tgt, a manipulation amount of each manipulated variable (ignition timing, secondary air, wastegate valve opening, engine speed) for the exhaust gas temperature increase control is set to a preset constant value regardless of temperature Tg of GPF 22.

During the filter temperature increase control, when temperature Tg of GPF 22 is lower than or equal to target GPF temperature point Tgt, the correction amount of each manipulated variable (for example, ignition timing, secondary air, wastegate valve opening, engine speed) is set to a preset constant value with respect to temperature Tg of GPF 22. In this way, when temperature Tg of GPF 22 is lower than or equal to target GPF temperature point Tgt, a manipulation amount of each manipulated variable (ignition timing, secondary air, wastegate valve opening, engine speed) for the exhaust gas temperature increase control is set to a preset constant value regardless of temperature Tg of GPF 22.

In the thirteenth embodiment, the correction amount of each manipulated variable (ignition timing, secondary air, wastegate valve opening, and engine speed) for the catalyst temperature increase control and filter temperature increase control may be set such that the correction amount increases as temperature Tt of three-way catalyst 21 decreases with respect to target three-way catalyst temperature point Ttt, or as temperature Tg of GPF 22 decreases with respect to target GPF temperature point Tgt. In this way, the exhaust gas temperature increase control of the thirteenth embodiment may set greater the manipulation amount of each manipulated variable (ignition timing, secondary air, waste gate valve opening, and engine speed) than the normal control, as temperature Tt of three-way catalyst 21 decreases with respect to target three-way catalyst temperature point Ttt, or as temperature Tg of GPF 22 decreases with respect to target GPF temperature point Tgt.

Figure 30:
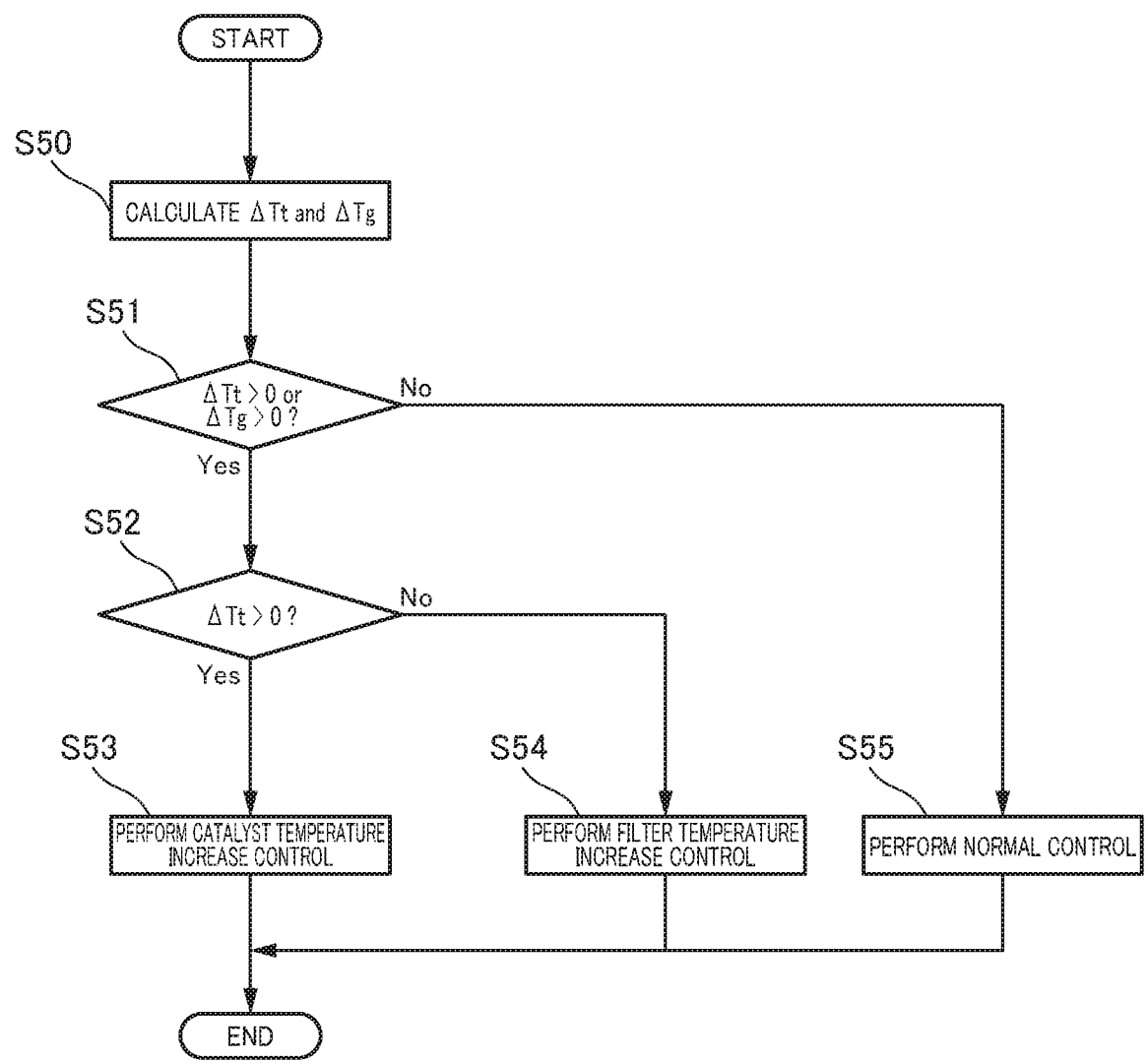
FIG. 30 is a flowchart showing a flow of exhaust purifier temperature control according to the thirteenth embodiment.

FIG. 30 is a flowchart showing a flow of exhaust purifier temperature control according to the thirteenth embodiment described above.

At Step S50, it calculates temperature difference ΔTt by subtracting a current value of temperature Tt of three-way catalyst 21 from target three-way catalyst temperature point Ttt, and calculates temperature difference ΔTg by subtracting a current value of temperature Tg of GPF 22 from target GPF temperature point Tgt.

At Step S51, it determines whether or not temperature difference ΔTt is greater than zero, and whether or not temperature difference ΔTg is greater than zero. When temperature difference ΔTt or temperature difference ΔTg is greater than zero, the process proceeds to Step S52. When both of temperature difference ΔTt and temperature difference ΔTg are less than or equal to zero, the process proceeds to Step S55.

At Step S52, it determines whether or not temperature difference ΔTt is greater than zero. When temperature difference ΔTt is greater than zero, the process proceeds to Step S53. When temperature difference ΔTt is less than or equal to zero, the process proceeds to Step S54.

At Step S53, it performs the catalyst temperature increase control according to the thirteenth embodiment. At Step S54, it performs the filter temperature increase control according to the thirteenth embodiment. At Step S55, it performs the normal control.

The thirteenth embodiment described above produces behavior and effects similar to those of the sixth embodiment.

As described above, the GPF collection efficiency correlates with temperature Tg of GPF 22, the particle diameter of the exhaust particulate matter, and the space velocity of the exhaust gas flowing through the GPF 22. Accordingly, the manipulated variables employed for the filter temperature increase control may be determined in consideration of the GPF collection efficiency during the filter temperature increase control.

Specifically, for the filter temperature increase control of the thirteenth embodiment in which the manipulated variables are manipulated, one of the manipulated variables that is advantageous in improving the GPF collection efficiency may be selected with priority.

Furthermore, for the catalyst temperature increase control of the thirteenth embodiment in which the manipulated variables are manipulated, it is desirable to select, as one of the manipulated variables, the ignition timing that most contributes to increase in temperature Tt of three-way catalyst 21.

In each embodiment described above where the catalyst temperature increase control and the filter temperature increase control employ a plurality of manipulated variables, the manipulated variables manipulated for the filter temperature increase control may be different from the manipulated variables manipulated for the catalyst temperature increase control. For example, it may be configured such that the catalyst temperature increase control manipulates the ignition timing and secondary air, whereas the filter temperature increase control manipulates the wastegate valve and engine speed.

The invention claimed is:
1. An internal combustion engine exhaust purifier temperature control method for an internal combustion engine system in which an exhaust purifier is disposed in an exhaust passage connected to an internal combustion engine, and is structured to purify exhaust gas exhausted from the internal combustion engine, and the exhaust purifier includes a filter structured to collect exhaust particulate matter contained in the exhaust gas and a catalyst disposed upstream of the filter structured to purify the exhaust gas, the internal combustion engine exhaust purifier temperature control method comprising:
performing a predetermined exhaust gas temperature increase control to increase temperature of the exhaust gas, in response to a condition that a temperature of the filter is lower than or equal to a first preset temperature point;
setting the first preset temperature point, based on a collection efficiency at which the filter collects the exhaust particulate matter,
performing the predetermined exhaust gas temperature increase control, in response to a condition that a temperature of the catalyst is lower than or equal to a second preset temperature point;
composing the predetermined exhaust gas temperature increase control of a filter temperature increase control and a catalyst temperature increase control, wherein the filter temperature increase control is to increase the temperature of the exhaust gas so as to set the temperature of the filter higher than or equal to the first preset temperature point, and wherein the catalyst temperature increase control is to increase the temperature of the exhaust gas so as to set the temperature of the catalyst higher than or equal to the second preset temperature point;
setting a first determination value in accordance with a value obtained by subtracting the temperature of the filter from the first preset temperature point;
setting a second determination value in accordance with a value obtained by subtracting the temperature of the catalyst from the second preset temperature point;

comparing the first determination value with the second determination value;

performing the filter temperature increase control in response to a condition that the first determination value is greater than the second determination value; and performing the catalyst temperature increase control in response to a condition that the second determination value is greater than the first determination value.

2. The internal combustion engine exhaust purifier temperature control method as claimed in claim 1, further comprising:

setting the first preset temperature point lower than a temperature point at which the exhaust particulate matter collected by the filter is burned and removed.

3. The internal combustion engine exhaust purifier temperature control method as claimed in claim 1, further comprising:

setting the first preset temperature point to a lowermost value of a temperature range, wherein when the temperature of the filter is in the temperature range, the collection efficiency of the filter for the exhaust particulate matter converges within a predetermined range.

4. The internal combustion engine exhaust purifier temperature control method as claimed in claim 1, further comprising:

performing the filter temperature increase control, after performing the catalyst temperature increase control.

5. The internal combustion engine exhaust purifier temperature control method as claimed in claim 4, further comprising:

setting a first manipulation amount of a manipulated variable during the filter temperature increase control, wherein the manipulated variable is manipulated to increase the temperature of the exhaust purifier; and setting a second manipulation amount of the manipulated variable during the catalyst temperature increase control, wherein the second manipulation amount is different from the first manipulation amount.

6. The internal combustion engine exhaust purifier temperature control method as claimed in claim 4, further comprising:

employing a first number of manipulated variables to be manipulated to increase the temperature of the exhaust purifier during the filter temperature increase control; and employing a second number of manipulated variables to be manipulated to increase the temperature of the exhaust purifier during the catalyst temperature increase control, wherein the second number is different from the first number.

7. The internal combustion engine exhaust purifier temperature control method as claimed in claim 1, further comprising:

in response to a condition that the exhaust purifier is low in temperature, retarding ignition timing of the internal combustion engine so as to increase the temperature of the exhaust purifier, wherein the ignition timing is a manipulated variable to be manipulated to increase the temperature of the exhaust purifier.

8. The internal combustion engine exhaust purifier temperature control method as claimed in claim 1, wherein the exhaust passage includes a portion upstream of the exhaust purifier that is structured to be supplied with secondary air, the internal combustion engine exhaust purifier temperature control method further comprising:

in response to a condition that the exhaust purifier is low in temperature, supplying an amount of the secondary air so as to increase the temperature of the exhaust purifier, wherein the amount of secondary air is a manipulated variable to be manipulated to increase the temperature of the exhaust purifier.

9. The internal combustion engine exhaust purifier temperature control method as claimed in claim 1, wherein the exhaust passage is provided with a turbine of a turbocharger upstream of the exhaust purifier, and is connected to an exhaust bypass passage bypassing the turbine, and wherein the exhaust bypass passage is provided with a wastegate valve structured to open and close the exhaust bypass passage, the internal combustion engine exhaust purifier temperature control method further comprising:

in response to a condition that the exhaust purifier is low in temperature, increasing a degree of opening of the wastegate valve so as to increase the temperature of the exhaust purifier, wherein the degree of opening of the wastegate valve is a manipulated variable to be manipulated to increase the temperature of the exhaust purifier.

10. The internal combustion engine exhaust purifier temperature control method as claimed in claim 1, further comprising:

in response to a condition that the exhaust purifier is low in temperature, increasing engine speed of the internal combustion engine so as to increase the temperature of the exhaust purifier, wherein the engine speed is a manipulated variable to be manipulated to increase the temperature of the exhaust purifier.

11. An internal combustion engine control device comprising:

an exhaust purifier structured to purify exhaust gas in an exhaust passage connected to an internal combustion engine, wherein the exhaust purifier includes a filter structured to collect exhaust particulate matter in the exhaust passage and a catalyst disposed upstream of the filter structured to purify the exhaust pas; and a control section configured to control temperature of the exhaust purifier;

wherein the control section is configured to:

perform a predetermined exhaust gas temperature increase control to increase temperature of the exhaust gas, in response to a condition that a temperature of the filter is lower than or equal to a first preset temperature point;

set the first preset temperature point, based on collection efficiency at which the filter collects the exhaust particulate matter, perform the predetermined exhaust gas temperature increase control, in response to a condition that a temperature of the catalyst is lower than or equal to a second preset temperature point;

compose the predetermined exhaust gas temperature increase control of a filter temperature increase control and a catalyst temperature increase control, wherein the filter temperature increase control is to increase the temperature of the exhaust gas so as to set the temperature of the filter higher than or equal to the first preset temperature point, and wherein the catalyst temperature increase control is to increase the temperature of the exhaust gas so as to set the temperature of the catalyst higher than or equal to the second preset temperature point;

set a first determination value in accordance with a value obtained by subtracting the temperature of the filter from the first preset temperature point;

set a second determination value in accordance with a value obtained by subtracting the temperature of the catalyst from the second preset temperature point;

compare the first determination value with the second determination value;

perform the filter temperature increase control in response to a condition that the first determination value is greater than the second determination value; and perform the catalyst temperature increase control in response to a condition that the second determination value is greater than the first determination value.

* * * * *